(12) United States Patent
Adirim

(10) Patent No.: US 10,641,510 B2
(45) Date of Patent: May 5, 2020

(54) METHOD AND SYSTEM FOR CONTROLLING THE HEATING AND COOLING REQUIREMENTS IN A MODULAR HEAT ENERGY NETWORK

(71) Applicant: Groundswell Grid Energy Corp., Toronto (CA)

(72) Inventor: Daniel Adirim, Toronto (CA)

(73) Assignee: Groundswell Grid Energy Corp., Toronto, Ontario (CA)

( * ) Notice: Subject to any disclaimer, the term of this patent is extended or adjusted under 35 U.S.C. 154(b) by 0 days.

(21) Appl. No.: 16/199,004

(22) Filed: Nov. 23, 2018

(65) Prior Publication Data

US 2019/0154288 A1  May 23, 2019

Related U.S. Application Data

(60) Provisional application No. 62/590,330, filed on Nov. 23, 2017.

(51) Int. Cl.
| | |
|---|---|
| *F25B 30/00* | (2006.01) |
| *F24F 5/00* | (2006.01) |
| *F24F 11/30* | (2018.01) |
| *F24T 50/00* | (2018.01) |
| *F25B 30/06* | (2006.01) |
| *F24F 11/49* | (2018.01) |
| *F24F 11/64* | (2018.01) |
| *F24F 11/83* | (2018.01) |
| *G05B 19/4155* | (2006.01) |
| *F24D 10/00* | (2006.01) |
| *F24F 130/10* | (2018.01) |

(Continued)

(52) U.S. Cl.
CPC ............. *F24F 11/30* (2018.01); *F24D 10/00* (2013.01); *F24F 5/005* (2013.01); *F24F 11/49* (2018.01); *F24F 11/64* (2018.01); *F24F 11/83* (2018.01); *F24T 50/00* (2018.05); *F25B 30/06* (2013.01); *G05B 19/4155* (2013.01); *F24F 2005/0053* (2013.01); *F24F 2005/0057* (2013.01); *F24F 2130/10* (2018.01); *F24F 2140/50* (2018.01); *F24F 2140/60* (2018.01); *F24T 2201/00* (2018.05); *F25B 13/00* (2013.01); *F25B 2313/002* (2013.01); *F25B 2500/29* (2013.01); *F25B 2500/31* (2013.01); *G05B 2219/2614* (2013.01)

(58) Field of Classification Search
CPC .......... F25B 30/00; F25B 30/06; F24D 10/00; F24T 50/00; F24F 11/30; F24F 11/83; F24F 5/005
See application file for complete search history.

(56) References Cited

U.S. PATENT DOCUMENTS

| | | | |
|---|---|---|---|
| 2011/0114284 A1* | 5/2011 | Siegenthaler | F24T 10/00 165/45 |
| 2014/0110082 A1 | 4/2014 | Suver | |

(Continued)

*Primary Examiner* — Mark A Connolly
(74) *Attorney, Agent, or Firm* — Aird & McBurney LP

(57) ABSTRACT

A method and system for optimizing the operation of a geo-exchange system, by generating predictive models pertaining to energy demand and energy capacity for a particular building or district, based on data from sensors associated with components of a district geo-exchange system, historical and real-time operational data associated with district modules, including weather forecast data and current weather conditions.

23 Claims, 17 Drawing Sheets

(51) Int. Cl.
    *F24F 140/50*      (2018.01)
    *F24F 140/60*      (2018.01)
    *F25B 13/00*       (2006.01)

(56) References Cited

U.S. PATENT DOCUMENTS

| | | | | |
|---|---|---|---|---|
| 2014/0298843 A1* | 10/2014 | Burton | ................... | F24F 3/001 |
| | | | | 62/238.7 |
| 2015/0219370 A1* | 8/2015 | Kato | ...................... | B29C 70/46 |
| | | | | 62/238.7 |
| 2018/0195778 A1* | 7/2018 | Crawford | ............... | F24T 10/15 |

* cited by examiner

METHOD AND SYSTEM FOR CONTROLLING THE HEATING AND COOLING REQUIREMENTS IN A MODULAR HEAT ENERGY NETWORK

CROSS-REFERENCE TO RELATED APPLICATIONS

This application claims priority to U.S. Provisional Application Ser. No. 62/590,330 filed on Nov. 23, 2017.

FIELD OF INVENTION

The present invention relates to operating a utility. More specifically, it relates to receiving a plurality of data from sensors, historical and real-time operational data associated with district modules to optimize the operation of a district geo-exchange system.

BACKGROUND

Heating and cooling for residential, commercial and institutional building is typically provided through combustion of natural gas, heating oil, propane or resistive electric heating. District energy systems are being adopted in high density urban locations. Such systems typically involve large upfront investments in central plants and require very large pipes to distribute the heat energy, which are very intrusive and expensive to deploy. High temperature fluid for heating (the reverse for cooling) is distributed to buildings which, in turn, typically use air handlers to distribute the heat or cool within buildings. Accordingly, the pipe diameter limits the amount of heat being distributed and its cost to implement limits the number of buildings that can be connected to the system. However, geo-exchange systems are gaining in popularity as these systems provide heating and cooling energy efficiently and use renewable heat energy from the ground.

Generally, geo-exchange systems incorporate a ground-source heat pump (GSHP) and a ground loop, also called a ground heat exchanger (GHX). Heat pumps enable energy efficient fuel switching to electricity which itself is increasingly renewable as solar and wind prices drop. In particular, while GSHPs are energy efficient, in urban areas, however, they command a very high capital cost for the ground loop. In many jurisdictions, electricity is significantly more expensive than natural gas and therefore the operating cost can also be high, and therefore reducing the operating cost of a GSHP improves the economic return of geo-exchange.

Moreover, GSHP performance varies over the course of the heating or cooling system. In the case of heating, performance is high at the start of winter but drops as heat is removed from the ground. A GSHP's effective coefficient of performance (COP) is an average over the season. If the heat energy balance is not maintained over the course of a year, the ground loop can chill (or warm) such that GSHP performance worsens over time and the economic cost increases. However, GHXs are generally regarded as expensive heat sources or heat sinks because of the cost of drilling of boreholes that accommodate conduits carrying the working fluid. The size of the GHX is determined by both the peak heating demand and the net heat demand over a season. Accordingly, reducing the size of the GHX required will improve the economic return for geo-exchange.

It is an object of the present invention to mitigate or obviate at least one of the above-mentioned disadvantages.

SUMMARY OF THE INVENTION

In one of its aspects, there is provided a district geo-exchange system associated with a plurality of buildings in a district module, the system comprising:

the module comprising at least one component chosen from a group comprising a district pipe loop, heat source, heat sink, interconnection conduit, circulation pump, ground source heat pump (GSHP), valve, ground heat exchanger (GHX), and a meter; wherein the GHX is comprised of pipes with a working fluid, the pipes buried in the ground in vertical or horizontal boreholes; and wherein the GSHP transfers energy from a refrigerant to a working fluid within a conduit of the district pipe loop to a heat distribution mechanism within the plurality of buildings, or vice versa;

at least one sensor operable to measure a parameter associated with the at least one component in real-time and gather sensor data;

a controller for receiving at least one of sensor data, operational data from the at least one component, weather forecast data and current weather data to generate a heating and/or cooling supply and demand forecast for each of the plurality of buildings for any time of day.

In yet another of its aspects, there is provided a method of controlling the heating and cooling requirement in a modular heat energy network, the method comprising the steps of:

causing at least one sensor to measure a parameter associated with the at least one component in modular heat energy network in real-time and gather sensor data, the at least one component chosen from a group comprising a district pipe loop, heat source, heat sink, interconnection conduit, circulation pump, ground source heat pump (GSHP), valve, ground heat exchanger (GHX), and a meter; wherein the GHX is comprised of pipes with a working fluid, the pipes buried in the ground in vertical or horizontal boreholes; and wherein the GSHP transfers energy from a refrigerant to a working fluid within a conduit of the district pipe loop to a heat distribution mechanism within the plurality of buildings, or vice versa;

at a controller, receiving at least one of sensor data, operational data from the at least one component, weather forecast data and current weather data; and at the controller, generating a heating and/or cooling supply and demand forecast for each of the plurality of buildings for any time of day.

In yet another of its aspects, there is provided a district geo-exchange system associated with a plurality of buildings in a district module, the system comprising:

the module comprising at least one component chosen from a group comprising a district pipe loop, heat source, heat sink, interconnection conduit, circulation pump, ground source heat pump (GSHP), valve, ground heat exchanger (GHX), and a meter;

at least one sensor operable to measure a parameter associated with the at least one component in real-time;

a memory device with computer-readable program code stored thereon;

a processing device operatively coupled to the memory device, wherein the processing device is configured to execute the computer-readable program code to at least:

receive operational data from the building ground source heat pump (GSHP) including inlet and outlet temperature, runtime and liquid flow rate;

receive operational data from at least one component chosen from the group comprising the district pipe loop, heat source, heat sink, interconnection conduit, circulation pump, valve, ground heat exchanger (GHX), and the meter;

receive weather forecasts associated with a geographical area associated with the plurality of buildings;

generate a heating and/or cooling supply and demand forecast for each of the plurality of buildings for any time of day, said heating and/or cooling supply and demand forecast based on historical operational data;

generate a heat source and/or heat sink capacity forecast for each of the heat sources and heat sink demand forecasts based on operational historical data; and generate a cost forecast associated with the heat source and/or heat sink capacity forecast;

generate a net demand forecast for the district;

determine whether accessing at least one ground heat exchanger is beneficial and cost-effective to meet the net demand forecast, and when accessing the ground heat exchanger is neither beneficial nor cost-effective, determine whether another adjacent district module can serve as a potential energy source; and adjusting the temperature of the ground heat exchanger based on the forecasts and the operational data.

Advantageously, the system optimizes the operation of a geo-exchange system, by generating predictive models pertaining to energy demand and energy capacity for a particular building or district, based on data from sensors associated with components of a district geo-exchange system, historical and real-time operational data associated with district modules, including weather forecast data and current weather conditions. In addition, the system employs these predictive models to reduce the capital cost of the system by taking advantage of alternative heat sources based on local availability: groundwater or surface water (aquifers, lakes, ponds), process heat (e.g. from refrigeration sources, industrial activity, combined heat and power systems, etc.), waste heat (e.g. sewage) and other renewable heat sources (e.g. hot water heated by solar energy).

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
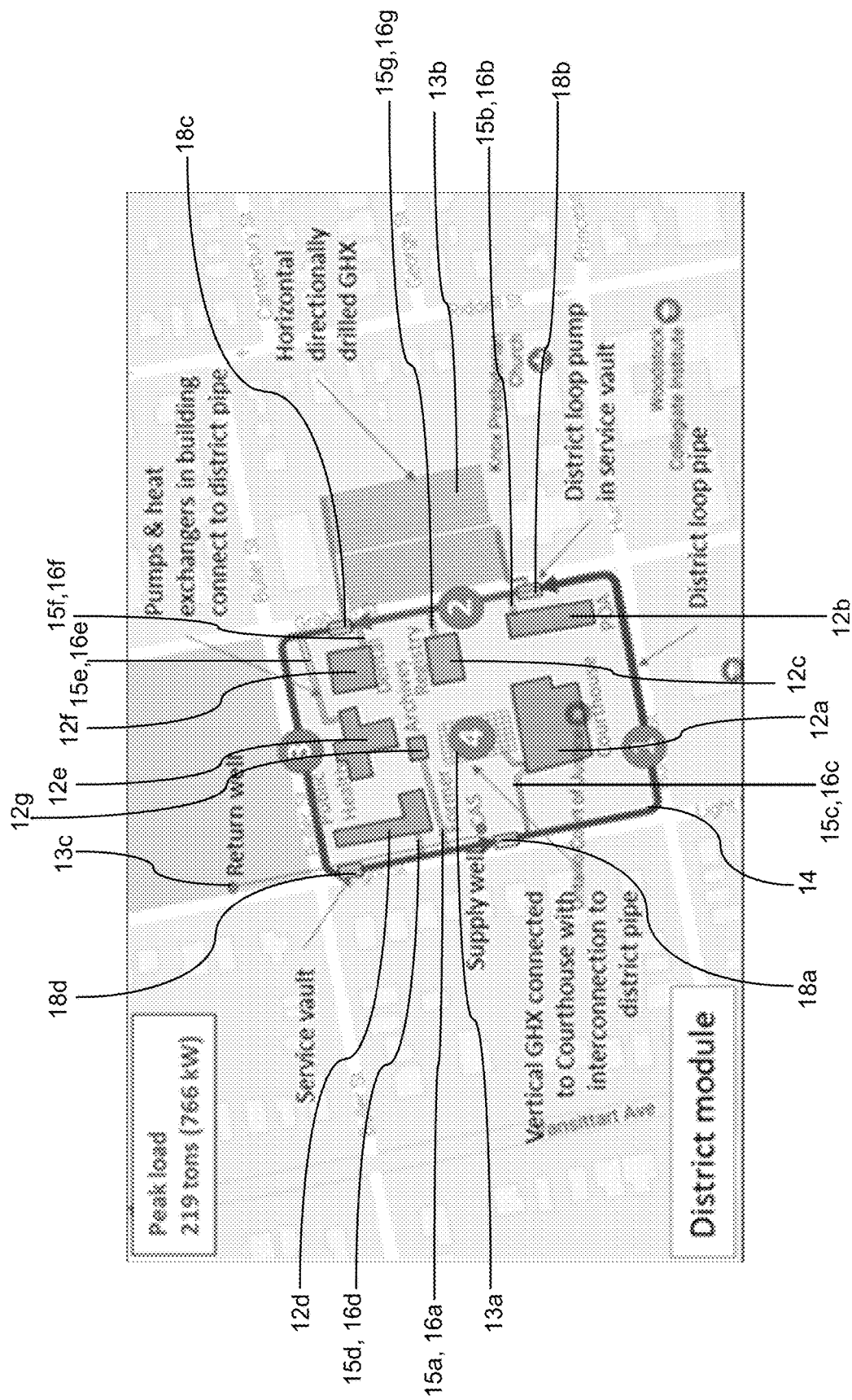
FIG. 1 shows a district module.
Figure 2:
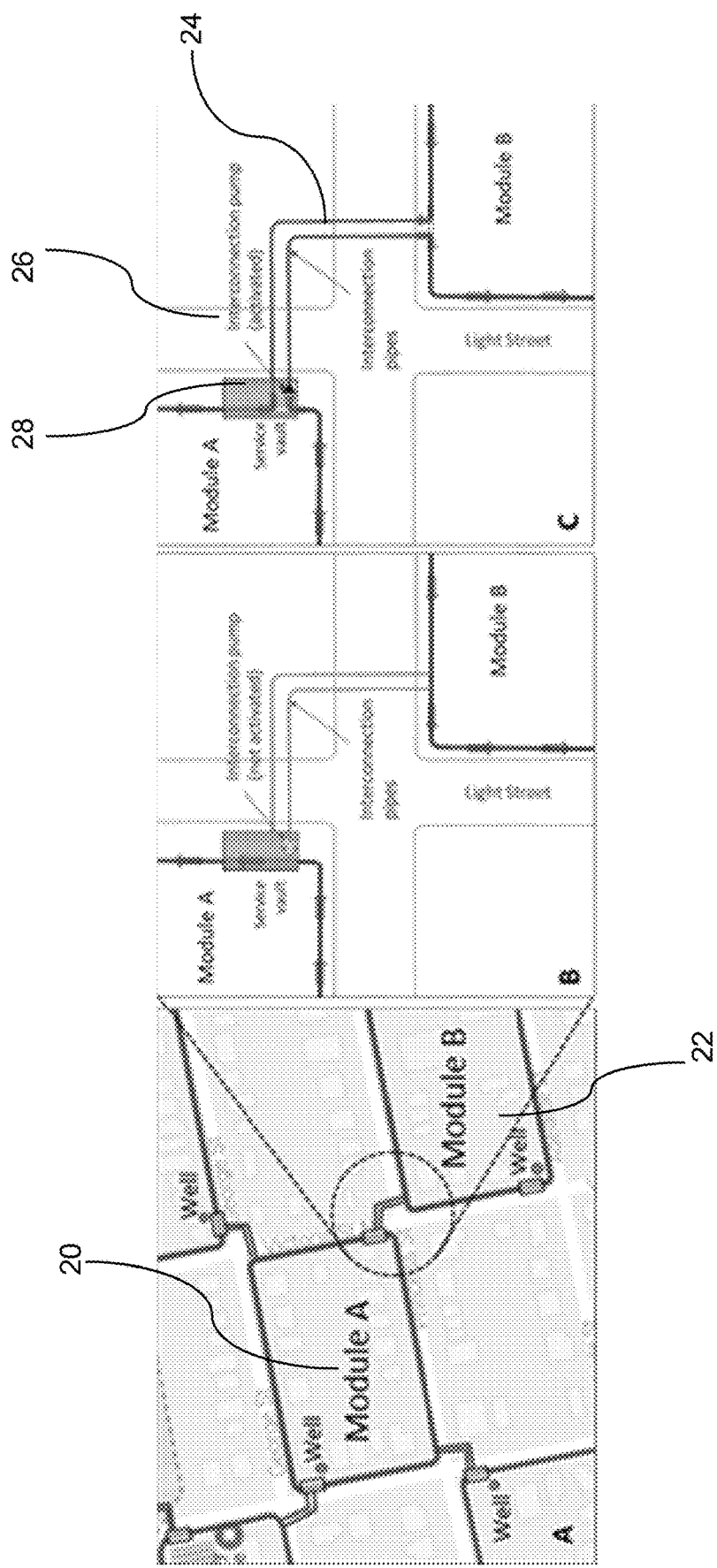
FIG. 2 shows an interconnection between two typical district modules.

Referring to FIGS. 1 and 2, there is shown an exemplary single district module 10 comprising a plurality of institutional buildings 12a-g, and a plurality of heat sources, vertical GHX 13a, horizontal GHX 13b and ground water or aquifer 13c, coupled to district loop conduit 14. Module 10 also includes a plurality of heat pumps 15a-g associated with each of the buildings 12a-g, and operatively connected to district loop conduit 14. Service vaults 18a-d serve as accessible connection points to GHX modules, water wells, heat exchangers, circulation pumps, valves, system sensors and controls, and interconnection pipes between adjacent district modules. Ground source heat pumps (GHSPs) 15a-g are located inside buildings and transfer heat to and from district loop conduit 14.

Heat sources also comprise low-grade heat sources such as, process heat 13d, e.g. heat from refrigeration systems, combined heat and power (CHP) systems or industrial sources, ice rinks and thermal energy from renewable sources e.g. solar thermal, and waste heat 13e, such as heat from sewer water or other dumped industrial sources. An exemplary source of waste heat is sewage heat recovery (not illustrated). The water leaving a multi-unit residential building (MURB) contains warm water from washing, cooking, etc., and, using an appropriate heat exchanger, the water can act as a source of waste heat for a district geo-exchange system. An example of process heat is rejected heat from an ice rink i.e. chillers used to dissipate the heat rejected during ice-making.

Buildings can be connected to each other using a heat energy network comprising a single pipe in a loop surrounding one or more city blocks. By locating sources and sinks for heat appropriately, the pipe can be sized to meet the demand of the largest group of buildings in the district loop between heat sources (or sinks). In general, a single pipe loop with a circulating pump can be considered a module. Other city blocks can be serviced by additional modules with interconnections between them, and these interconnections provide another source/sink for heat.

Generally, the economic cost of GHXs 13a, 13b is variable as it is influenced by the cost of energy to store heat which is influenced by the availability of heat energy and electricity (assuming a cost differential between peak and off-peak electricity rates). The cost of energy from aquifer 13c is based on the temperature of the water and the cost to operate the pump.

GSHPs 15a-g generally transfer energy from the refrigerant to a working fluid e.g. a water/propylene glycol mixture, within the conduit 14 to the heat distribution mechanism in the building, or vice versa. Within the GSHPs 15a-g, the refrigerant can be any fluid or combination of a number of fluids that is capable of being vaporised or partially vaporised in the heat exchanger to support vapor-compression refrigeration.

An exemplary GHX 13a, 13b is comprised of high-density polyethylene (HDPE) pipes buried in the ground in boreholes. An exemplary vertically drilled GHX 13a contains vertical boreholes to depths up to 200 m or 650 feet. Generally, boreholes are drilled vertically when space is limited, such as urban areas. An exemplary, horizontally drilled GHX 13b, contains horizontal boreholes (to depths up to 10 m or 33 feet), or horizontal trenches (to depths up to 2.5 m or 8 feet). Horizontally drilled boreholes can be drilled in several layers and minimize the amount of excavation required to install horizontal piping on a site (e.g. under a municipal park). Generally, geological conditions must be evaluated for suitability.

Now referring to FIG. 2, there is shown interconnected district modules 20 and 22. Such an approach allows for expansion of the district geo-exchange system across a large geographical area, such as a city. A modular design eliminates the need for a central plant and expansion can be based on future demand. Another advantage of the modular approach is that it introduces several layers of redundancies, as systems relying on a central energy plant have a single point of failure. Modular systems allow for the isolation of sections with a mechanical issue requiring repair, localizing the impact and protecting other modules. If demand in one module, e.g. district module 20, is greater than can be met by the supply of energy within that district module 20, then the excess energy can be provided by an adjacent district module 22 with interconnections 24 between district modules 20 and 22. Interconnections 24 enable additional economies of scale. For example, if a park or a parking lot is being used for GHX 13b, it would be practical to drill as many boreholes as the capacity of the land will support even if this exceeds the demand of the immediate module. Through interconnection piping 24, excess GHX capacity in a module can support nearby modules. Excess waste heat (e.g. from an ice rink) in one module can be distributed across others. Heat can reasonably be transferred throughout the district in this manner.

Figure 3:
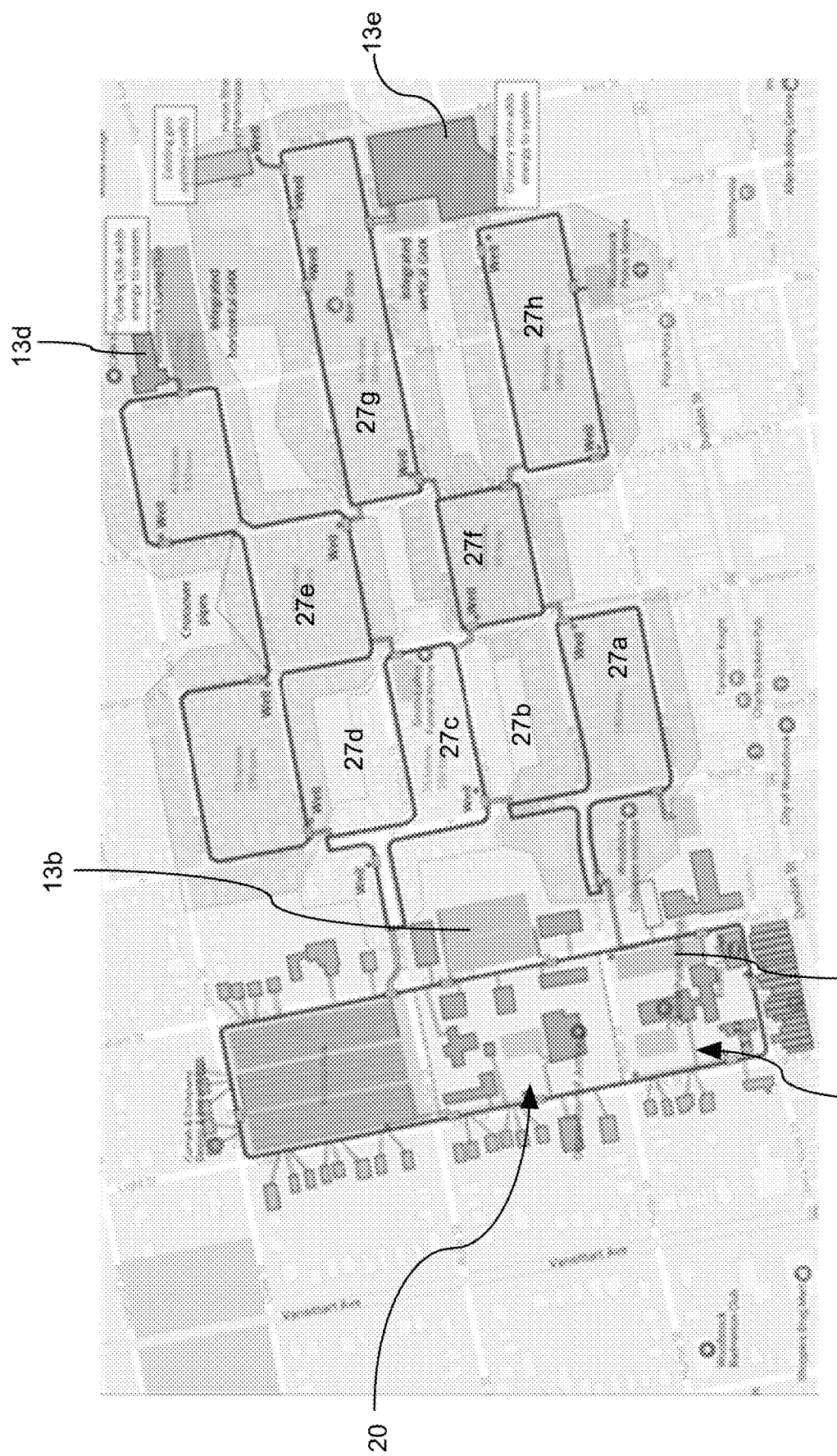
FIG. 3 shows interconnections between a plurality of district modules.

As shown in FIG. 3, interconnection pumps 26 can be established between district modules. New modules 27a-h in a district can be added to existing modules 20, 22 without impact via pre-planned stubs and would be located inside buried service vaults as shown in FIG. 2. In one example, when interconnection pump 26 is not activated two district modules 20, 27c operate independently, and activating interconnection pump 26 transfers fluid (energy) between district modules 20, 27c when the temperature between the two is different. Accordingly, service vault 28 is needed on one of the district modules 20 or 27c to house interconnection pump 26.

In another implementation, a modular district geo-exchange system is implemented for medium-density neighbourhoods, and residential blocks that include only single-family residences without land for GHX 13a, 13b, as energy can be transferred inter-district, as shown in FIG. 3. As can be seen from the exemplary interconnected districts 20 and 27a-h, there exists three possible heat sources: the refrigeration systems at a curling club 13d, a grocery store 13e, and groundwater. These sources can potentially contribute heat for distribution throughout the system via interconnected district modules. Accordingly, the need for GHX 13a, 13b is minimized, despite the many low-rise residential houses, given the mix of available groundwater, heat sources and the ability to share energy between modules.

A district geo-exchange system can be designed to be replicated cost-effectively. For example, developing a number of standard components that can be assembled in a limited number of configurations enables the purchase of components (e.g. HDPE pipe, pumps and service vaults) in quantity to achieve cost reductions. Given that standard pumps, meters and valves behave predictably and are easier to identify from monitoring solutions when out of compliance, such standard components help contractors develop cost-effective methods to install them and helps maintenance staff to support them through standard operating procedures.

Figure 4:
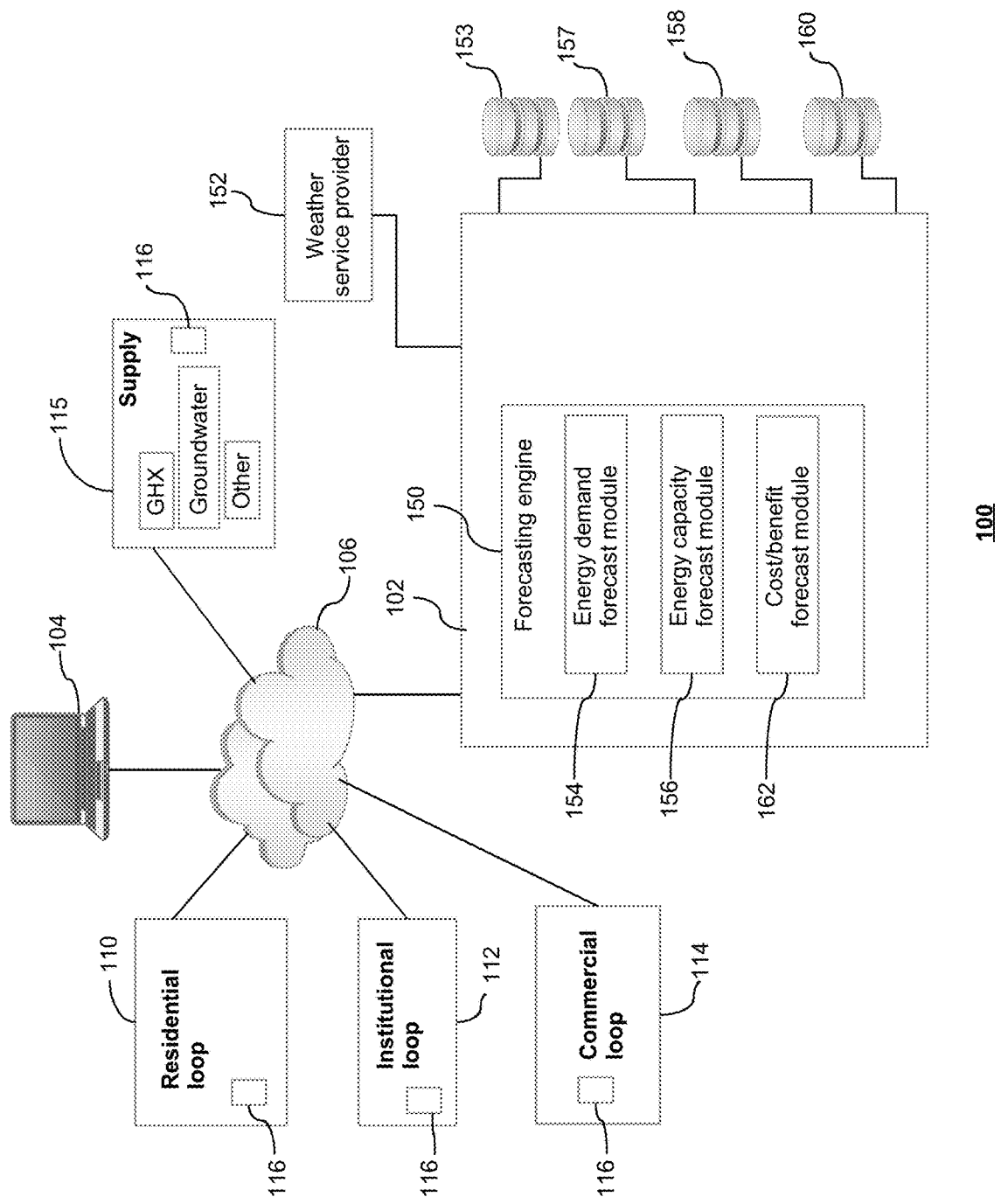
FIG. 4 shows an exemplary environment in which a method and system for optimizing a geo-exchange system operates.
Figure 5:
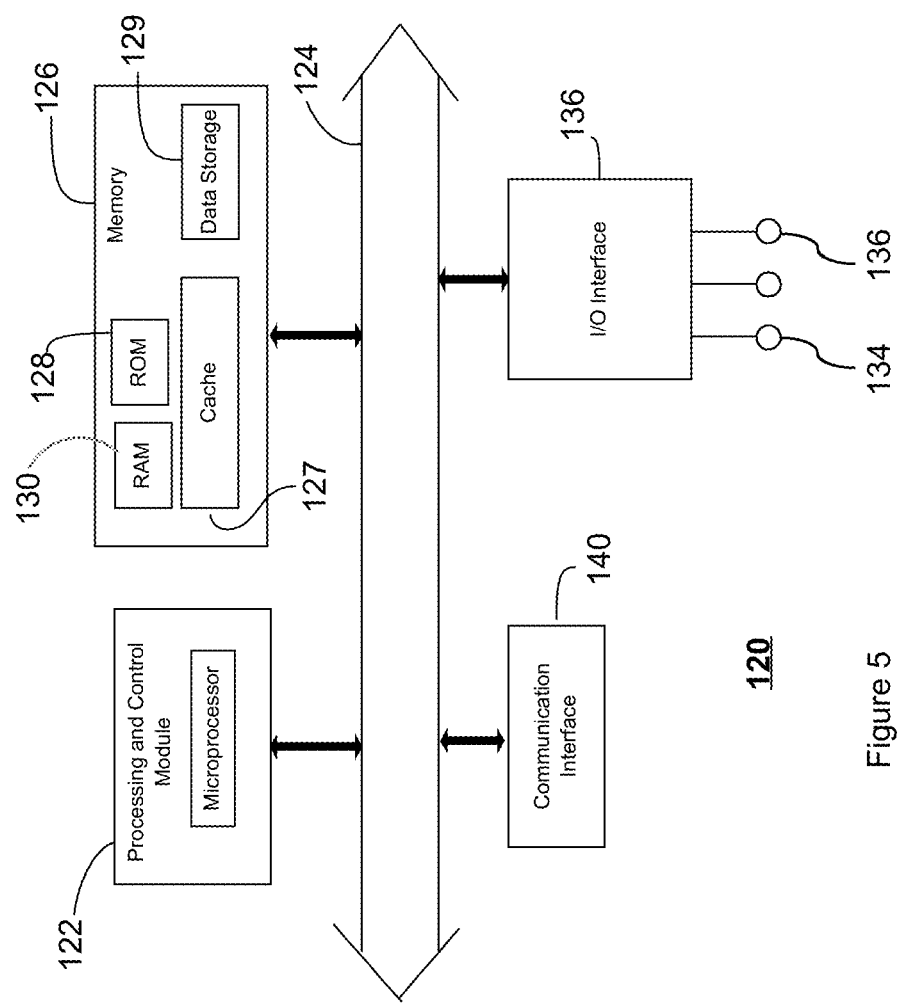
FIG. 5 shows an exemplary computing system.

A detailed description of the methods and systems surrounding the concepts of optimizing a GHSP will now follow. Several variations shall be discussed herein as the various embodiments are set forth. FIG. 4 shows a top-level component architecture diagram of an exemplary environment, generally identified by reference numeral 100, for which the methods and systems for optimizing a district geo-exchange system. As shown, FIG. 4 illustrates environment 100, in which a user interacts with central district geo-exchange system (CDGES) controller 102, such as an application server, via user computer 104 communicatively coupled thereto via communication medium 106, or network, e.g., the Internet, and/or any other suitable network. The computers of environment 100 comprise the features of computing device 120 and may include, but are not limited to a client computer, a server computer, and distributed server computers.

Residential buildings 110, institutional buildings 112 and commercial buildings 114, and supply 115 include a plurality of sensors 116 for collecting real-time measurements related to temperature of the working fluid, flow-rate, status of valves (open or closed), indoor air temperature, indoor relative humidity, outdoor air temperature, outdoor relative humidity, supply air temperature and return air temperature, building temperature (interior and exterior), operational data from the district pipe loop, heat source, heat sink, interconnection conduit, circulation pumps, ground source heat pump (GSHP), valve, ground heat exchanger (GHX), and the meter. Sensors 116 may be networked sensor devices e.g. Internet-of-Things (IoT) devices, or sensors 116 may be coupled to a computing device or gateway computer communicatively coupled to communication medium 106. Accordingly, measurements from sensors 116 or sensor data is received by CDGES controller 102.

User interface coupled to I/O interface 136 allows a user to input operational parameters, view the operational status of the heating and cooling system, and monitor the status of the heating and cooling system. CDGES controller 102 is generally in electronic communication with various sensors 116 associated with switches, motors, valves, pumps, and monitors that control the operation of heating and cooling system thereby allowing controller 102 to monitor the operating conditions of heating and cooling components of one or more district modules in real-time.

Accordingly, CDGES controller 102 also receives operational data from each building. Alternatively, operational data is received by a gateway computer associated with each building. Performance metrics are calculated for each building, including the heating coefficient of performance (COP), cooling energy efficiency ratio (EER), average cycle times, percentage time in-use, time-of-use electricity consumption and estimated greenhouse gas (GHG) emission savings. Energy use by each building and/or the district loop can be metered with readily available energy meters. The meters monitor the temperature of the fluid entering and leaving the building and the flow rate of the fluid. The amount of energy taken from the fluid or rejected to the fluid is calculated based on the temperature difference and flow rate. In addition, the amount of energy to be transferred to and from the ground on an instantaneous basis (BTU/hr or kW) may be calculated, and the thermal properties of the earth in which the heat exchanger is built is recorded in real-time.

Figure 8A:
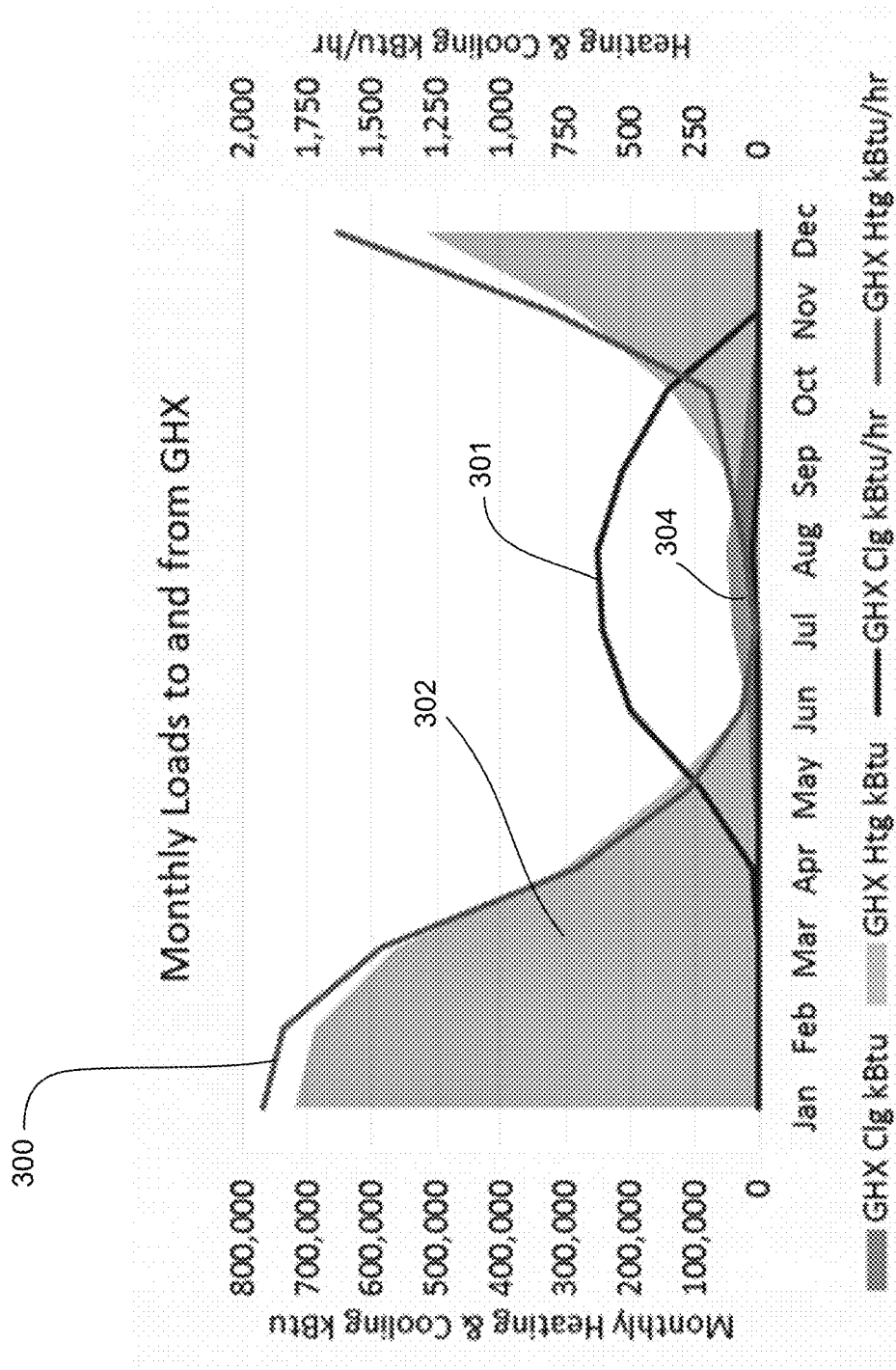
FIGS. 8a-c show graphs illustrating the effect of diverse heat sources (such as groundwater) on peak demand from a GHX and the potential for energy storage.
Figure 8B:
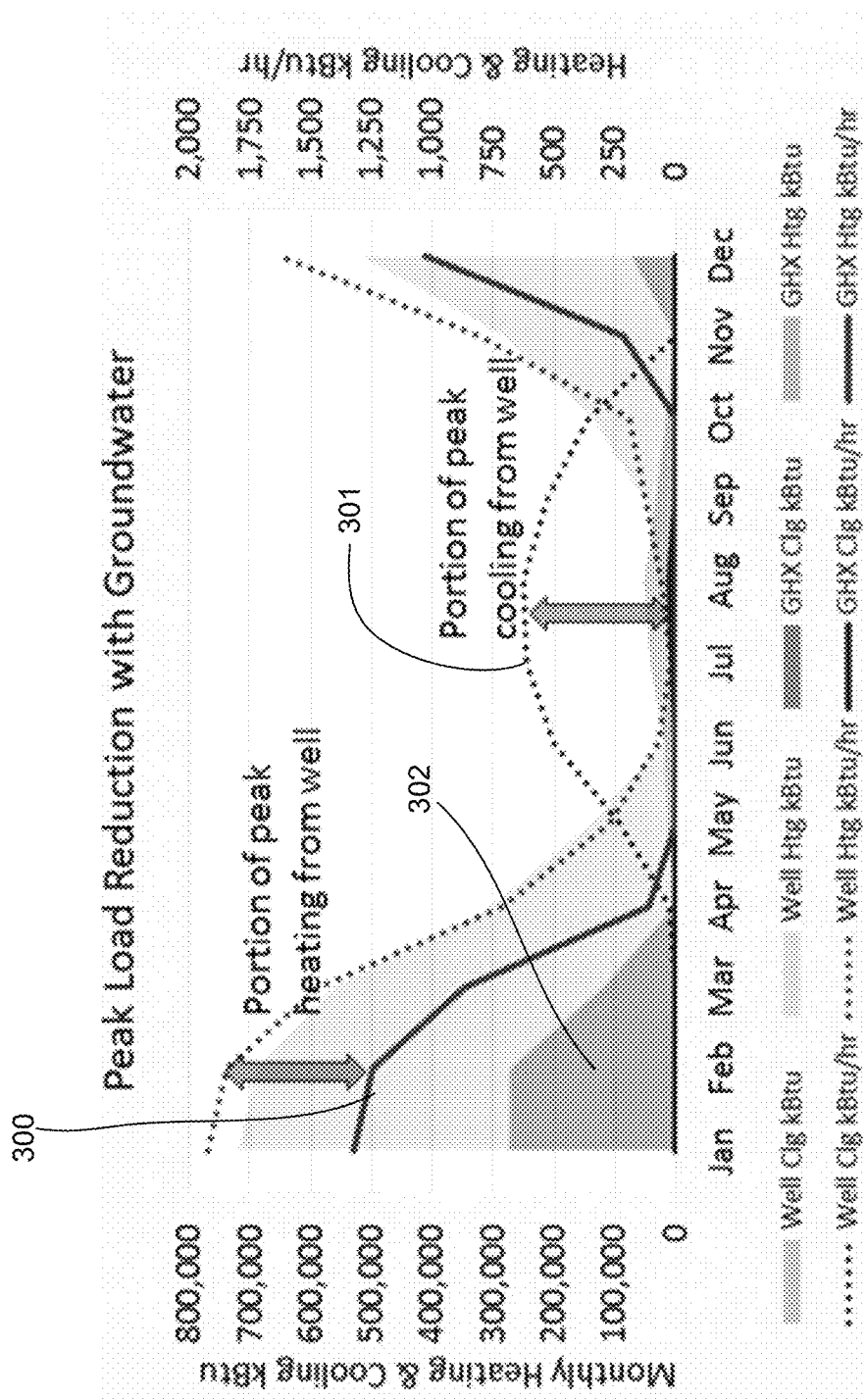
Figure 8C:
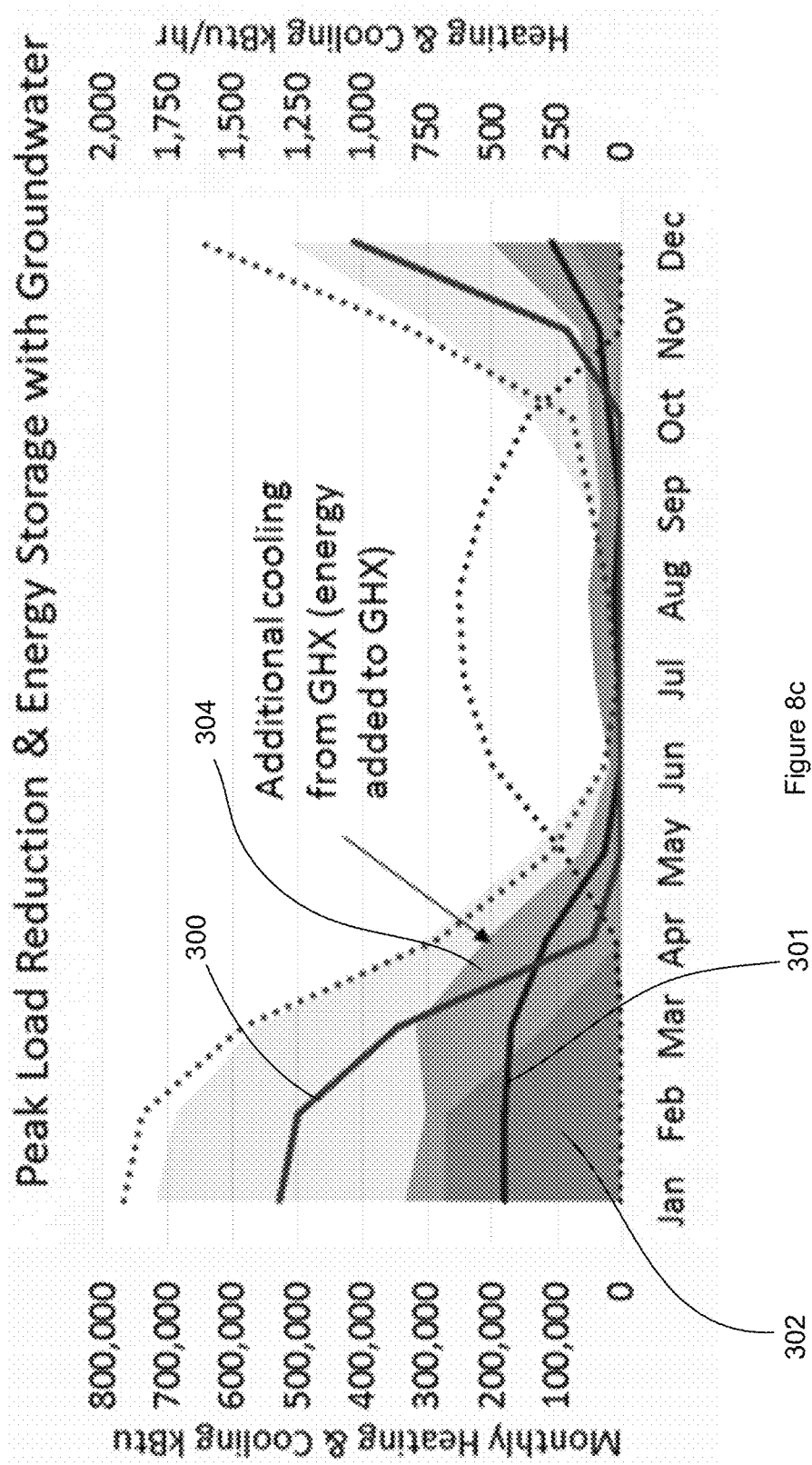

Additional operational data includes energy loads of the buildings connected to district pipe 14 within the district modules 20 or 22. The energy loads include the individual peak, or instantaneous heating or cooling loads of the building(s), as well as the net heat rejection to and net heat extraction from the GHX modules. In a typical city there is a diversity of building stock, including single family homes, apartments, offices, schools, churches, libraries, stores, restaurants, etc. The key difference between the building stock from the perspective of space heating and cooling is how they are used, including time-of-day occupancy patterns and the activities that occur within the building. The result is that even for buildings of a similar size and energy efficiency, they may have very different heat-loss profiles. As will be described below, the effect of diverse heat sources (such as groundwater) on peak demand from GHX 13a or 13b and the potential for energy storage is shown with reference to FIGS. 8a-c.

Figure 6:
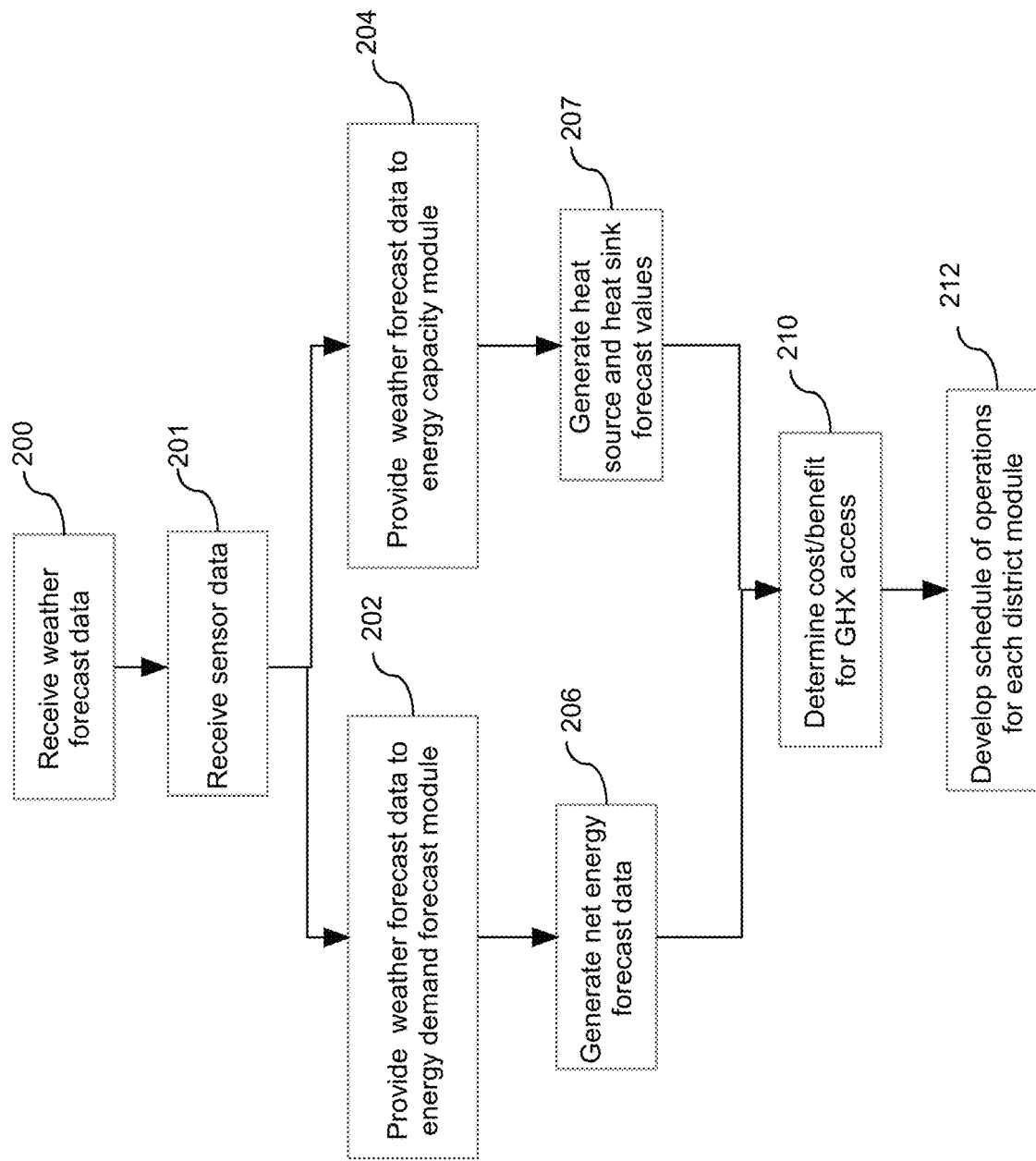
FIG. 6 shows a high-level flow diagram illustrating exemplary process steps for transforming sensor data, real-time operational data and historical operational data into an optimized district energy-demand management schedule.
Figure 7:
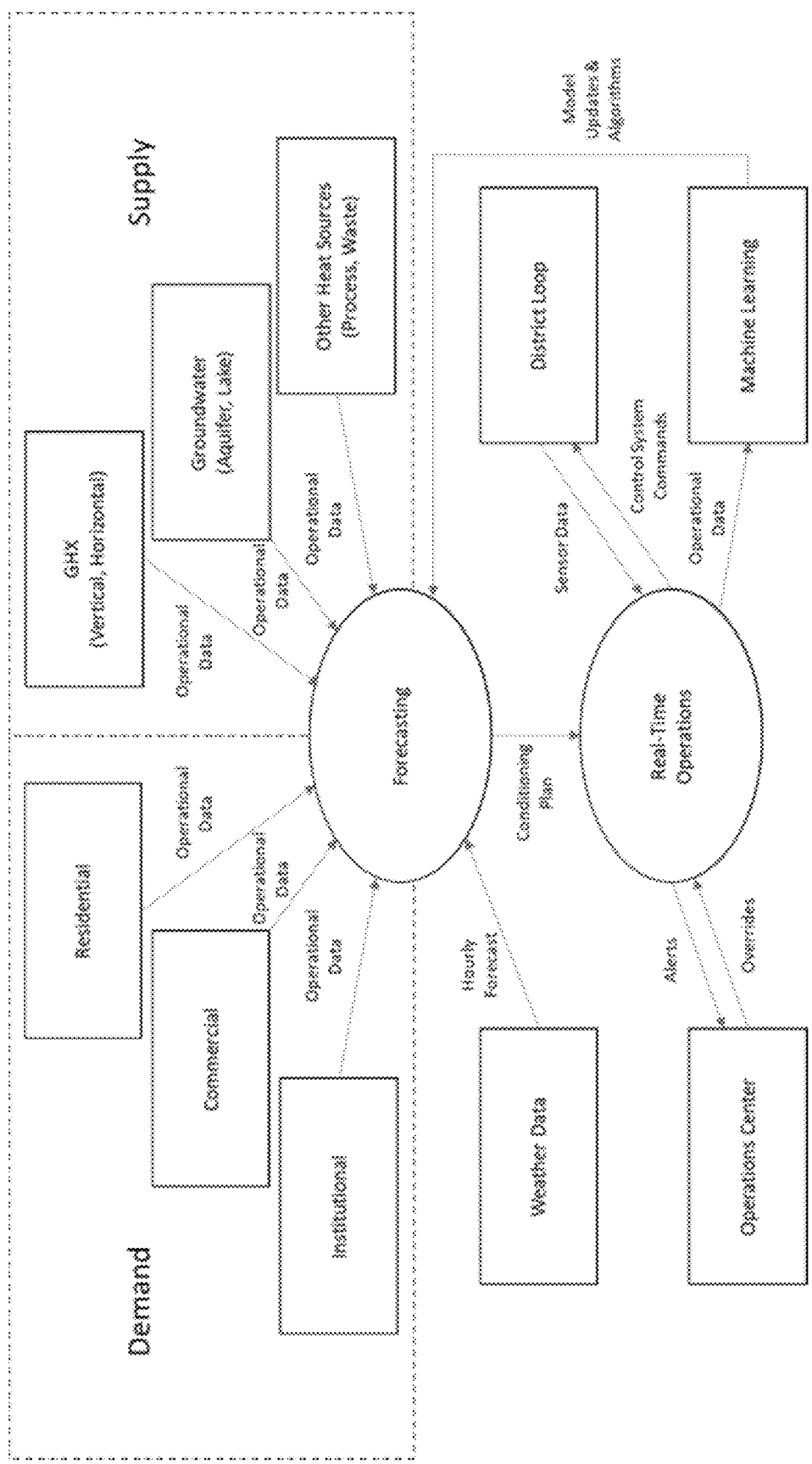
FIG. 7 shows a data flow diagram for optimization of a district geo-exchange system.

Now referring to FIGS. 6 and 7, there is shown a high-level flow diagram illustrating exemplary process steps for transforming sensor data, real-time operational data and historical operational data into an optimized district energy-demand management schedule, in FIG. 6; and FIG. 7 shows a data flow diagram for optimization of district geo-exchange system. Looking at FIG. 6, in step 200, forecasting engine 150 associated with CDGES controller 102 receives weather forecast data for a desired geographical area e.g. municipality or district, from weather service provider 152 via a third-party application program interface (API). Next in step 201, CDGES controller 102 receives sensor data from sensors 116 associated with the components of the district module. Weather forecast database 153 serves as a repository for storing data received from the weather service provider 152. Next, CDGES controller 102 provides the weather forecast data to energy demand forecast module 154 in step 202, and energy capacity forecast module 156 in step 204. Energy demand forecast module 154 generates forecast values for the heating, or cooling, demand for each building within the district(s) based on the weather forecast datasets and historical datasets pertaining to heating, or cooling, demand for each building, and sensor data stored in database 157. Energy demand forecast database 158 serves as a repository for storing data processed, received, and generated by energy demand forecast module 154, including historical data. In step 206, a forecast for net demand for district module(s) 20 or 22 is generated by energy demand forecast module 154. Energy capacity forecast module 156 generates heat source or heat sink forecast values for all the heat sources or heat sinks within the district module(s) 20 or 22 based on the weather forecast data and historical datasets pertaining to forecasts for heat source or heat sink capacity, in step 207. Energy capacity forecast database 160 serves as a repository for storing data processed, received, and generated by energy demand forecast module 154, including historical data. In addition, energy capacity forecast module 156 also generates a forecast of the costs associated with the forecasted heat source or heat sink capacity. Next, in step 208, cost/benefit module 162 receives an output from steps 206 and 207 to determine the cost and benefit of accessing storage GHX 13a or 13b in an effort to improve the performance of building GSHPs 15a-g. Steps 200 to 208 are performed for all modules within a district, and CDGES controller 102 evaluates adjacent district modules as potential sources of energy, in step 210.

In one exemplary implementation, CDGES controller 102 employs models to predict the heating and cooling demand of individual buildings incorporating intrinsic characteristics (size, construction method, etc.) and extrinsic characteristics (occupancy patterns, usage type, etc.) based on a weather forecast; including the net heating and cooling demand for all buildings connected to a district module. Models are also employed to predict the economic cost and potential quantity of heating and cooling for each heat source or sink attached to the district module; and to determine the cost-benefit trade-off to storing heating or cooling in GHXs 13a, 13b (based on excess availability at points-in-time or electricity rate differences) to meet forecasted demand and/or to raise or lower the temperature of the fluid in the district module in order to improve the efficiency of building GSHPs 15a-g.

In addition, models are also employed to determine if excess heating or cooling in one module can be economically used in adjacent district models as interconnections between district modules can enable the transfer of heat across one or more modules.

Based on the outputs from energy demand forecast module 154 and energy capacity forecast module 156, and associated models, a schedule of operation (or conditioning plan) is developed for each building or district module 20 or 22 in step 212. For example, the conditioning plan may be set out in predetermined increments of time, such as every 15 minutes. Sensor data may be employed to monitor the system performance and adjust the plan based on near real-time observations. The models also incorporate observed differences in expected and actual system and component behavior to improve the models developed. As an example, when available supply of heating is significantly in excess of forecasted daily demand, the models may be used to evaluate the economic benefit of heat storage for demand over several days (using a weather forecast of lower confidence) and for the next season (without reliance on a weather forecast). These models may be employed together, separately, or in sub-combination in daily operation to improve the operating conditions for the majority of the buildings in the district module. Models used will differ across modules 20, 22 based on the mix of buildings and heat sources and sinks connected to each district module. When insufficient operational data exists for buildings or heat sources or sinks, a simplified representation may be used. If a detailed forecast of demand is unavailable, the system can be operated entirely by operators in the operations center.

Energy demand forecast module 154 and energy capacity forecast module 156 may employ machine learning algorithms and models for determining the afore-mentioned forecast values.

Generally, each building has a distinct heat loss profile. The heat-loss profile is determined by a building's intrinsic characteristics: size, when the building was constructed (i.e. the Building Code in effect at the time of construction), number of windows, efficiency improvements, etc. The heat-loss profile is also impacted by its extrinsic characteristics which are represented by two main categories: usage type and environmental. Usage type includes occupancy, activity (e.g. hospitals, restaurants and offices have difference profiles), preferences (e.g. temperature settings, nightly set-back), etc., and a building's environmental characteristics include: solar potential (shaded or exposed to the sun); outside air temperature; weather (sun and wind); and time of day.

A model of a building's hourly energy consumption can be developed and these models represent a prediction based on building characteristics, expected usage and typical weather patterns. A simulation developed for a specific building may incorporate detailed building characteristics based on plans and reasonable assumptions for building occupancy. Actual energy consumption may differ based on actual occupancy, actual building construction and weather conditions. CDGES controller 102 may typically not have access to the details available to building HVAC engineers for every building connected to a district module but may be able to observe actual heating demand by monitoring GSHP performance.

CDGES controller 102 may infer two types of models for individual buildings from actual heating and cooling loads relative to outside temperature: a building's base demand and the effect of modifiers on that demand. Base demand: For a given temperature and user preferences, the building characteristics may determine "base" heating/cooling demand. Modifiers: The "base" demand may be modified by time of day, week or year and occupancy patterns.

The heating and cooling loads can be determined from GSHP 15e performance details which may include: inlet temperature (degrees C. or F); GSHP 15e cycles (count); heat pump stage or speed; temperature set-point; building temperature; duration of cycle (seconds); quantity of heat produced/rejected (BTU or J); electric power consumption (W or J). Heat produced (or rejected) is recorded for the observed outside air temperature and weather conditions. Because of occupancy variation and time of day, the demand may not be consistent for a given temperature. For all increments of observed heating demand at a specific temperature, quartile values can be determined. After multiple weeks, sufficient data may have been collected such that for a specific external temperature, the first quartile of demand value should reflect the building's base demand. At other times of the day, the variance relative to this value may reflect extrinsic characteristics, such as occupancy or usage.

The difference between actual demand relative to this base demand can be calculated. The difference reflects both occupancy and usage patterns. Assuming that, for any particular combination of time of day/day of week/external temperature, extrinsic characteristics of building heating demand are distributed on a probability function, the expected value for extrinsic demand can be independently determined through linear regression. This extrinsic demand can be expressed as a multiple of the base demand. For buildings with similar extrinsic factors, a multi-dimensional array of multipliers for time of day, week and external temperature can be developed. For example, a church could be virtually empty at night, host a preschool during the day, hold events most evenings, and have very large occupancy on Sunday. Another church may be occupied only on Sundays.

Regardless of a building's absolute value for base demand, if the pattern of usage is similar to a reference building, the multipliers for the reference building can be used to scale demand to provide the total expected demand as it represents occupancy and usage. This array of multipliers represents a model for buildings with similar extrinsic characteristics. Once assigned, the fit of a building's observed demand to a specific model can be tested over time. If usage patterns change, the reference building for another building's heating demand can switch from one model to another.

Over time, a collection, or library, of extrinsic demand models may be developed to represent building heating demand characteristics. Any given building will consume and reject heat throughout the day, an adjacent building may have a different heating and cooling profile. As an example, for any 15-minute interval, the demand for one building may be completely or partially met by the demand profile of others in the district module. The net demand profile for all buildings in the district module can be predicted in 15-minute increments for a specific time of day/week and weather condition. A district loop may also be connected to various heat sources and sinks depending on availability. Two considerations are needed when developing this model: the operating characteristics of the source or sink and its economic cost. The system itself has operating characteristics to consider as well.

It should be noted that the sources/sinks may not be equivalent, as they each have distinct operating characteristics and capacities that need to be modeled, for example:

Waste Heat: The available heat may not be consistent throughout the day or week. The available heat can be statistically modeled with a margin of error, and if the module has heat far in excess of immediate or anticipated demand, sewage pipe or groundwater can be used as a sink to remove it.

Process heat: The heat from refrigeration, CHP or industrial sources is expected to be relatively consistent but could experience scheduled variability (e.g. due to cycle changes in process manufacturing) and seasonality (e.g. heat energy in summer is not useful).

Groundwater: The capacity of groundwater as a source is based on the size of the aquifer, the movement of water in the aquifer and the volume of liquid that can be pumped.

GHX: The temperature of the GHX fluid, its size, its rate of dissipation (heat above or below ground temperature will equilibrate with its surroundings over time so there is a lifetime which is strongly impacted by the geology of the boreholes). For the purpose of supply management, there are two types of physically identical, but functionally distinct GHXs: storage GHX which is reserved for longer term storage of heat or cool; the temperature of conditioned GHX is elevated or decreased using off-peak electricity to improve the performance of building GSHPs; and operational GHX, which is used to alleviate intermittent temperature fluctuations.

The economic cost of a source/sink is the operational cost of the energy in the source/sink. Examples of economic cost are:

GHX: The economic cost of the GHX is variable as it is influenced by the cost of energy to store heat which is influenced by the availability of low-cost heat and the price of electricity (assuming a cost differential between peak and off-peak electricity rates).

Figure 9:
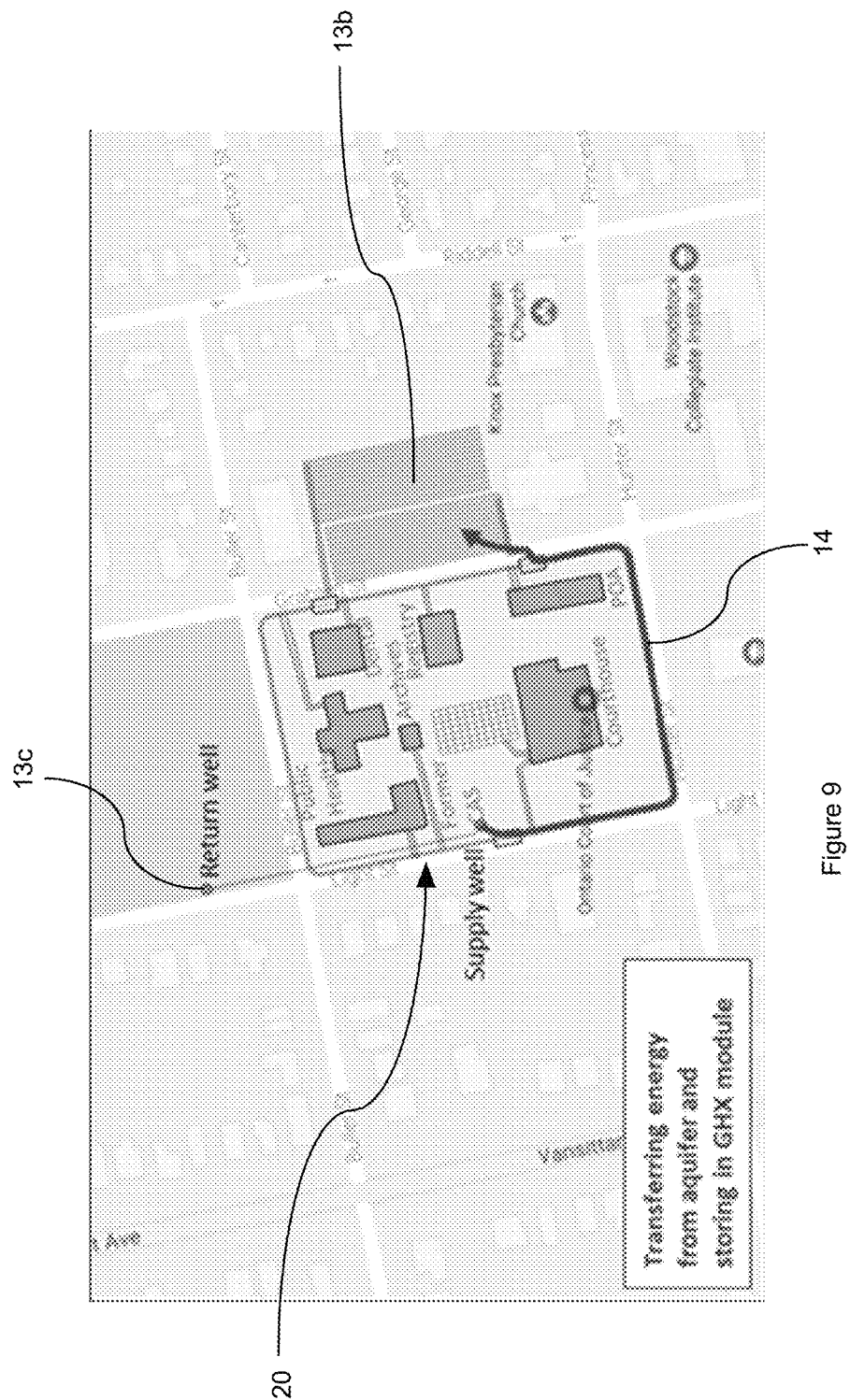
FIG. 9 shows conditioning of a GHX using groundwater.

Groundwater: As illustrated in FIG. 9, low-cost heat (or cooling) from an aquifer can be used to store thermal energy in GHX by running well, district loop and GHX pumps when the temperature of water in the aquifer is above (or below for cooling) the temperature of the GHX; the cost of energy from groundwater is based on the temperature of the water in the aquifer, lake or pond relative to that of the district module (or GHX) and the cost to operate the pump.

Waste heat: Heat from sewer water or other dumped industrial sources can be used if available when needed or bypassed if not required. There is a small operating cost to pump fluid past a heat exchanger.

Connected buildings: One building can be in heating mode while another is cooling; the rejected heat from one building can provide the heat needed by the next. This may be "free" heat for the district loop or may need to be removed from the district module.

Process Heat: By design, this heat is a revenue source for the district geo-exchange system and so it has a negative cost in winter, however during summer, the heat would reduce building GSHP performance and absorbing this heat out of season has a higher system cost (but may be contractually required).

Nearby districts: Based on building profiles connected to district module loops, some loops may require or have available more heat than others. An adjacent loop can provide heat by turning on loop interconnection pumps. By sequencing the operation of interconnection pumps, heat can be moved from one module to another several loops away.

Each source can be modeled relative to time of day and week. For example, for each district module, a table of the available sources and sinks for heat can be created with a forecasted quantity and expected economic cost over every 15-minute interval. Not only should the mix of supply be optimized to meet the expected demand, the performance of building GSHPs $15a$-$g$ should also be optimized by conditioning the temperature of the district loop.

As described above, a model for storage GHX $13a$ or $13b$ used to store heat can be developed. Conductivity testing (a measure of how heat dissipates over a 24-hour period), the number and depth of boreholes, and the geology are the primary determinants of the capacity of a Storage GHX instance. The model would also reflect operational characteristics that can be confirmed over time, and it would validate the capacity for heat storage and also the rate at which heat is transferred based on the difference in temperature between district loop 14 and GHX $13a$ or $13b$ which is expected to vary based on geology. The model would also have a rate of dissipation over an extended period of time and would be specific to each Storage GHX instance.

The model is useful for predicting how much it would cost to take advantage of excess heat when available or during off-peak electricity rates. This can be expressed relative to the improved performance of building GSHPs $15a$-$g$ connected to the district module as a result of elevating the temperature of the fluid in the district loop. Note that the desired temperature of a district module is a reflection of the heating profile of the majority of buildings attached to the district loop. If most of the buildings are in heating mode then the objective will be to raise the temperature, if most are in cooling mode (e.g. in a primarily commercial area or during summer) then the objective is to lower the temperature of the district loop 14 in a district module 20 or 22.

Optimizing the district module temperature is particularly helpful when there is a difference in electricity rates during the day. During heating season, off-peak electricity can be used to raise the temperature of storage GHX $13a$ or $13b$ (during cooling season the temperature of storage GHX $13a$ or $13b$ can be reduced). The stored heat can be introduced into the district loop 14 during peak electricity rate periods. This electricity rate arbitrage can be expressed as a "what if" type of analysis to optimize the cost.

In jurisdictions where there is a negligible difference in electricity rates, if low-cost heat is available (e.g. from process or waste heat sources or from solar hot water heating) when demand is low, heat storage can represent an economic advantage. The benefit outlined above is substantial. FIG. $8a$ shows estimated integrated annual energy load profile of the seven buildings of a district module 20 or 22. Line 300 indicates the peak heating needed in the buildings each month, the line 301 indicates the peak cooling load each month. Area 302 shows the total energy needed to heat the building while area 304 shows the total cooling required monthly. The intelligent use of groundwater (and other heat sources) dramatically reduces the demand for heat from the GHX $13a$ or $13b$ and permits heat storage, as shown in FIGS. $8b$-$c$. The savings are realized in both capital costs (less GHX required) and in operating costs.

Excess heat (or cool) can be identified from the table of supply sources for every 15-minute interval. During peak electricity rate periods, several scenarios can be developed to raise (or lower) the temperature of the district loop by a range of temperatures. Each interval represents a quantity of heat energy that will need to have been stored to satisfy the scenario. An optimization routine can be used to identify the cost and feasibility of storing excess heat (or cool) for each scenario, and the most efficient scenario for the district loop can be identified.

Although each district module 20 or 22 can operate independently, the ideal embodiment may be derived iteratively if adjacent modules have excess heat or cool. As a result, interconnections between district modules 20, 22 are an important tool in actively managing fluid temperatures delivered to GSHPs $15a$-$g$ in buildings. For example, if district module 22 in FIG. 2 is comprised primarily of single family residences that are primarily operating in heating mode, and district module 22 includes a number of commercial buildings that are rejecting heat to the district loop pipe 14, activating the interconnection pump 26 will transfer energy from district module 22 to district module 20. The working fluid in district module 22 cools, improving efficiency for buildings requiring cooling while homes in district module 20 operate more efficiently in heating with warmer working fluid.

A high-level weather forecast for future dates (up to a week in advance) can be used to determine expected demand and supply at an increasingly coarse level of granularity (e.g. in 3-hour increments). If a heating or cooling deficit is anticipated, excess heat or cool can be stored in storage GHX $13a$ or $13b$. At an even more coarse level of granularity (e.g. daily), demand for an upcoming season can be determined. The effectiveness of this strategy is dependent on the rate that heat (or cool) dissipates from the storage GHX $13a$ or $13b$.

The high-level weather forecast can also be used to predict supply. For example, rain (or snow melt) will recharge an aquifer and, typically, lower its temperature, and any cloud cover will impact the quantity of heat that can be expected from solar hot water heating.

A conditioning plan is a schedule for running a sequence of pumps such that heat is stored or removed in storage GHX $13a$ or $13b$. It is intended to address forecasted net deficits and surpluses of demand throughout the day along with district loop temperature optimization opportunities. For each district module and for every 15-minute interval, the "plan" will identify the sequence and duration of pump operation, the opening of valves, and expected temperatures at points along the district loop in order to meet the forecasted demand and optimization opportunities. The plan may be developed to take advantage of lowest cost supply and off-peak electricity rates (when available). FIG. 9 shows conditioning of a GHX $13a$ or $13b$ using groundwater.

There are always differences between reality and forecasts. These differences can reflect errors in the forecast model (weather, building demand or supply errors), unanticipated or extreme weather conditions or events (e.g. hosting the Olympics®), or maintenance issues. Fortunately, GSHPs $15a$-$g$ operate over a range of temperatures so abnormal situations do not mean that building heating or cooling demand cannot be met, only that performance may not be optimal.

In these situations, real-time monitoring and control can be used to adjust the conditioning plan. By evaluating variances in real-time operations relative to the forecasted schedule, improvements can be made in terms of the reference models used and the algorithms developed when creating the conditioning plan. For example, the length of time taken for the temperature to change in the district loop when a source or sink is added may depend on many factors, including pump and pipe size, the temperature differential between source and district pipe and more. This lag can be incorporated into the conditioning plan.

The outlined design and operation of the district geo-exchange system makes possible several important benefits. One benefit is that the peak and net heating and cooling demand of buildings attached to the district loop is significantly lower than the sum of the demand for each individual building. This results in needing less GHX for the district than is required individually. A detailed example follows.

Building energy loads vary widely, both on a daily basis and annually. The furnace in a home, or a mechanical system in an office building is typically sized to meet or exceed the greatest heating and cooling load the building can expect to see. This is referred to as the "peak heating" or "peak cooling" load. By definition, this load occurs only for a short time, as little as a few hours per year, while the rest of the year the heating and cooling loads are much lower. Drilling GHX just to meet peak demand can be expensive and non-feasible or impractical.

However, peak heating and cooling loads for different building types occur at different times of the day. In spring and fall single-family homes may require heating while other buildings down the street may need cooling. In shoulder seasons, homes typically draw heat from the system while other buildings reject heat to it. When this occurs, energy demand to and from GHX 13a or 13b connected to the system is much lower. Because peak heating and cooling loads occur at different times and can offset the peaks of adjacent buildings, the size and capacity of the GHX for the district can be significantly reduced.

An example illustrating this difference is a similarly sized church and office building. Both buildings may have a peak cooling load of 50 kW (170,600 BTU/hr). The peak cooling load in the office will occur on a weekday afternoon, while the peak cooling load in the church will occur Sunday morning. The peak cooling load of the two buildings in an integrated system is not cumulative, it will be significantly lower than 100 kW (11,641,200 Btu/hr). A diversity of building types connected to a common GHX allows for a given energy source/sink to accommodate the loads of more buildings.

Figure 10A:
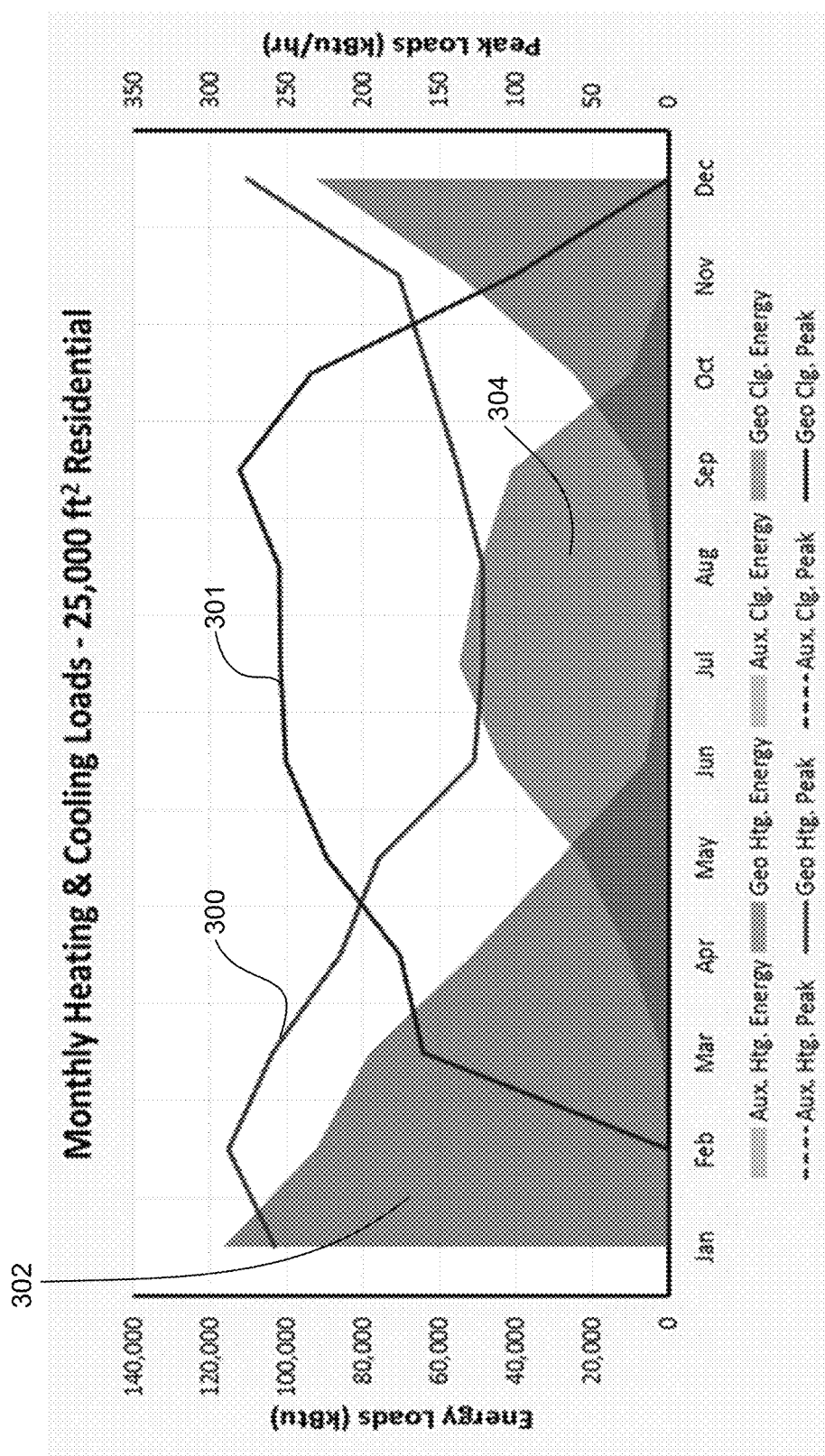
FIGS. 10a-b show annual heating and cooling load profiles of a number of typical residential single-family homes and commercial buildings.
Figure 10B:
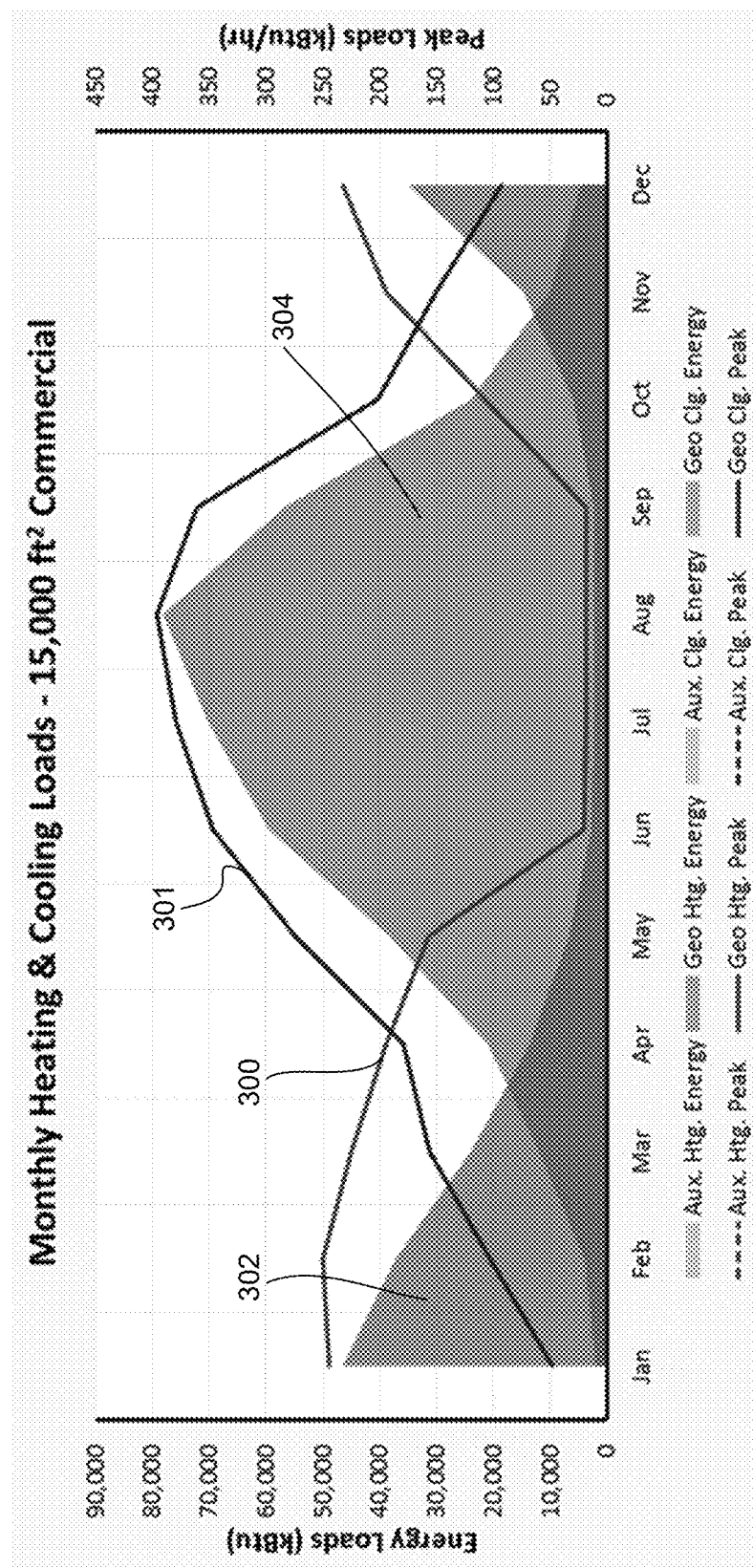

The impact of connecting different building types to a common is seen in FIGS. 10a-b to 12a-c. FIGS. 10a-b show the annual heating and cooling load profiles of a number of typical residential single-family homes (totaling 106,000 ft$^2$, or 2,300 m$^2$) and commercial buildings. Annual load profiles of a typical residence and small commercial office building shows some significant differences. The line 300 indicate the monthly peak heating requirements and the line 301 show peak cooling loads in kBTU/hr (right axis). Areas 302 indicate the total energy that must be delivered to the building on a monthly basis, while the areas 304 show the monthly cooling energy loads (left axis). Note that in a typical residence the total heating requirement is much greater than the cooling requirement, while a typical commercial building has the opposite behaviour.

Figure 11:
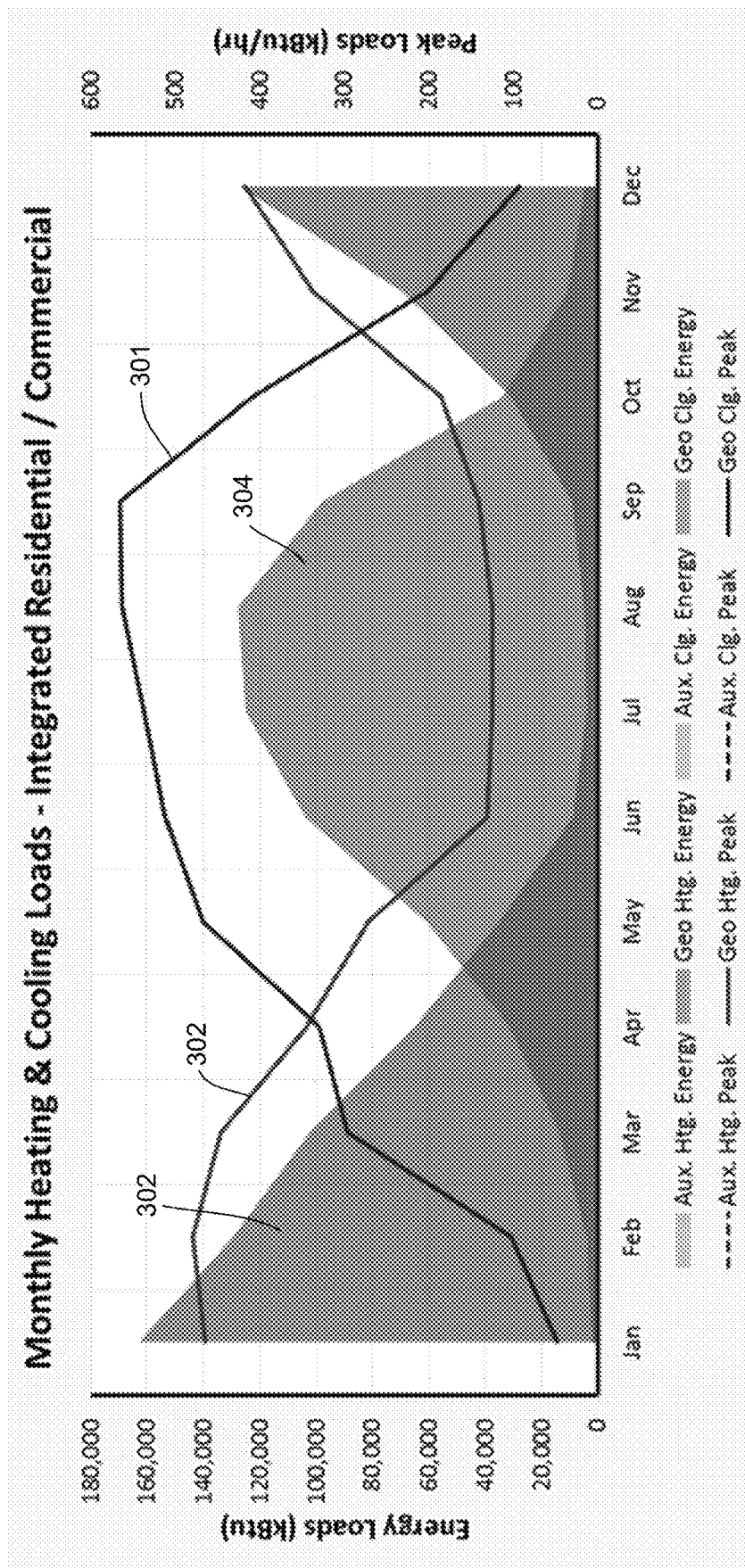
FIG. 11 shows the integrated annual load profiles of residential and commercial buildings and the reduction in the size of the GHX when the loads are integrated with a common system compared to a standalone GHX.

FIG. 11 shows the integrated annual load profiles of residential and commercial buildings and the reduction in the size of a standalone GHX compared to the GHX when the loads are integrated with a common system. Combining residences and commercial office space into a common GHX balances the amount of heating and cooling needed in the buildings. When approximately the same amount of energy is rejected to the ground (i.e. when cooling) as is removed from the ground (i.e. when heating), the size of the GHX can be reduced. When the loads are more balanced the size of the GHX can be significantly reduced.

Another benefit of district geo-exchange systems is the potential to integrate heat sources that are difficult or not available to a standalone building. When different types of buildings, waste energy and renewable energy resources are connected to a district system, individual buildings no longer rely solely on the ground as an energy source/sink, especially in spring and fall when heating and cooling loads are small. Other resources can meet the building demand. This reduces, and sometimes eliminates the need to run the pumps for the GHXs, enhancing overall system efficiency.

Figure 12A:
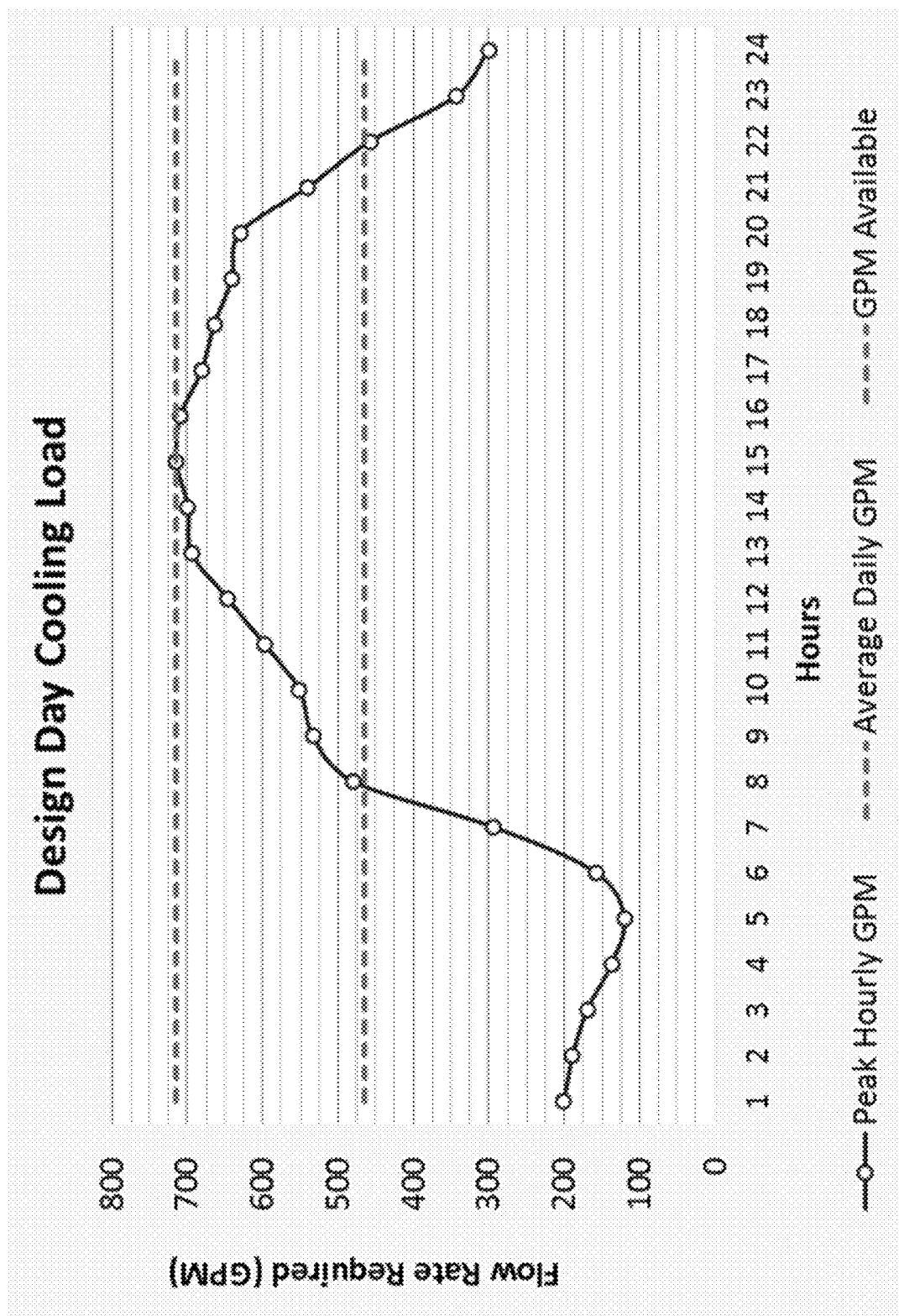
FIGS. 12a-c show the wide range in flow rates on a daily basis and a seasonal basis in a typical system.
Figure 12B:
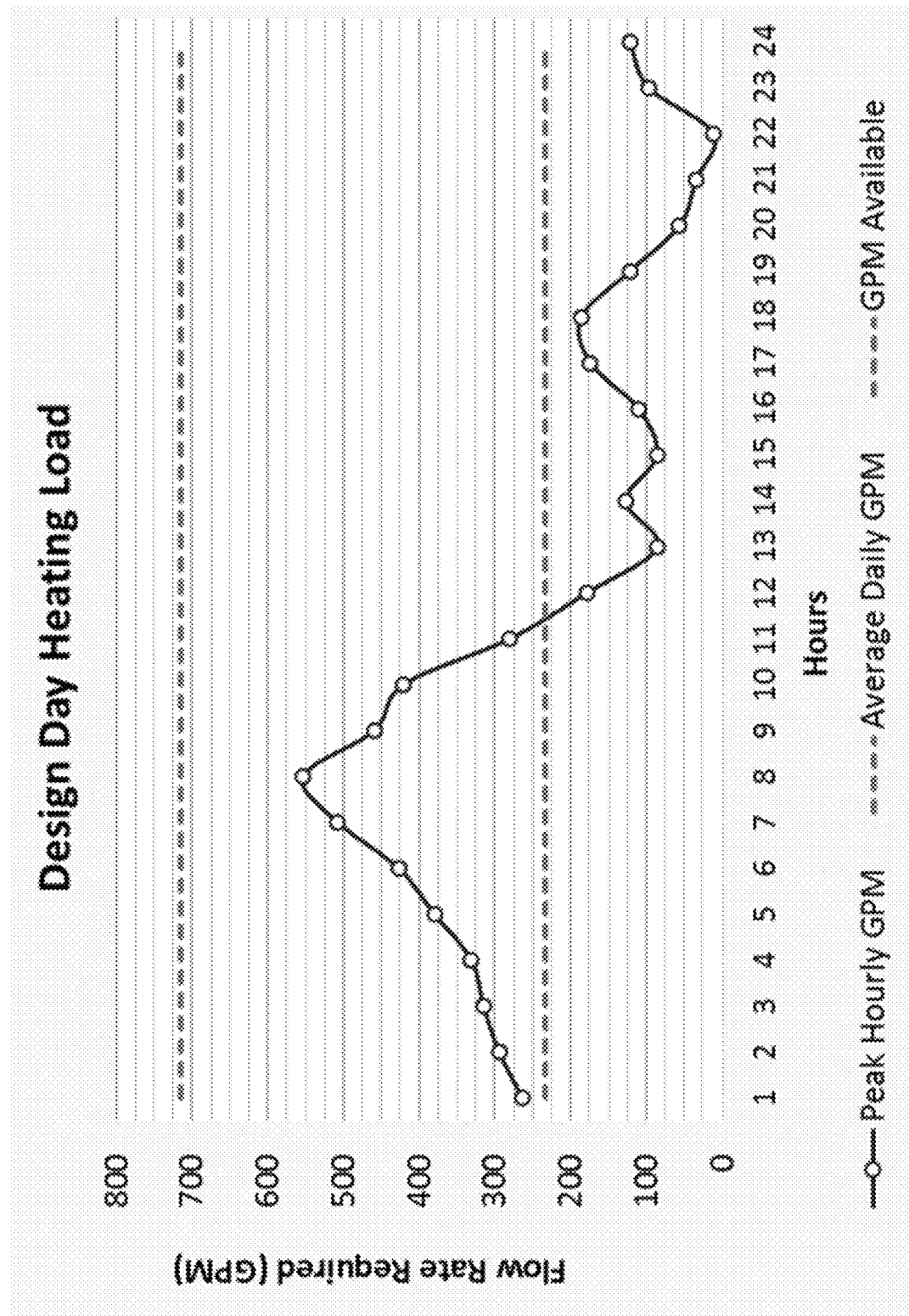
Figure 12C:
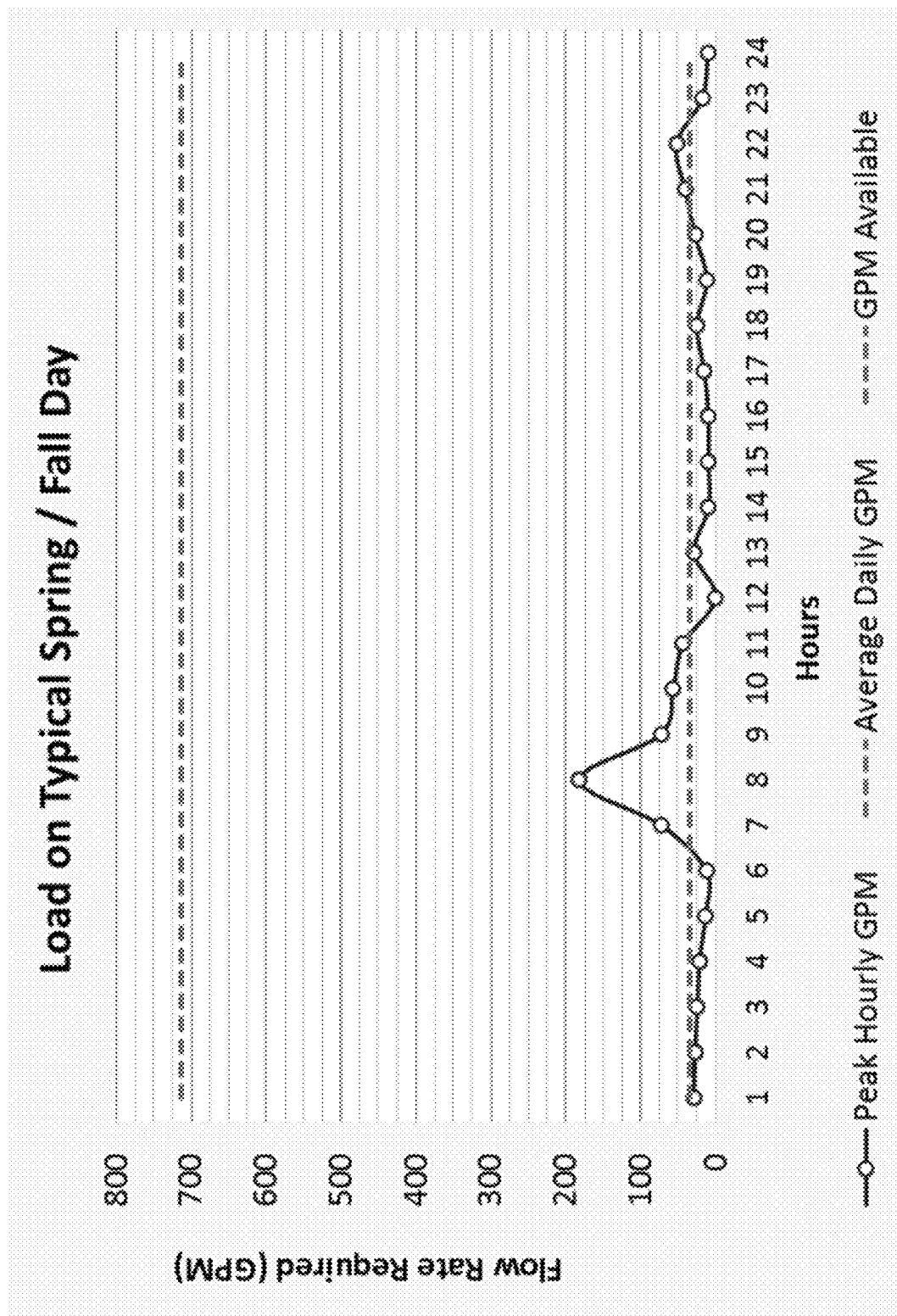

FIGS. 12a-c shows the wide range in flow rates on a daily basis and a seasonal basis in a typical system. Building loads can be rather dynamic on daily basis as well as a seasonal basis. The graphs show the flow rate of heat transfer fluid required for a typical commercial building on different days in the year. On a cooling day, this exemplary building requires a flow of approximately 45 L/s (700 gpm), but the average flow needed for the day is only about 29 L/s (465 gpm). On a heating day, the average flow needed is approximately 15 L/s (235 gpm), while in the shoulder seasons, the average flow needed is only 2 L/s (35 gpm), i.e. just 5% of the peak flow required, which can be met entirely by groundwater.

As outlined above, the present invention improves the energy efficiency of the district geo-exchange system by storing heat energy that would have otherwise been lost through conditioning.

In another aspect, the present invention lowers the cost of meeting building heating (or cooling) demand by modifying the temperature of the fluid in the district loop such that the inlet temperature of the GSHPs in the majority of building attached to the district loop is raised (or lowered), improving the GSHP COP. An increase of district loop temperature of only 10-20° F. can lead to GSHP efficiency improvements of 30-40%. In yet another aspect, the present invention maintains consistently high GSHP COP over the course of a season and over multiple years.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A district geo-exchange system associated with a plurality of buildings in a district module, the system comprising:

the module comprising at least one component chosen from a group comprising a district pipe loop, heat source, heat sink, interconnection conduit, circulation pump, ground source heat pump (GSHP), valve, ground heat exchanger (GHX), and a meter; wherein the GHX is comprised of pipes with a working fluid, the pipes buried in the ground in vertical or horizontal boreholes; and wherein the GSHPs transfers energy from a refrigerant to a working fluid within a conduit of the district pipe loop to a heat distribution mechanism within the plurality of buildings, or vice versa;

at least one sensor operable to measure a parameter associated with the at least one component in real-time and gather sensor data;

a controller for receiving at least one of sensor data, operational data from the at least one component, weather forecast data and current weather data to generate a heating and/or cooling supply and demand forecast for each of the plurality of buildings for any time of day.

2. The district geo-exchange system of claim 1, wherein the operational data is received from the building ground source heat pump (GSHP), the operational data comprising at least one of an inlet and outlet temperature, runtime and liquid flow rate.

3. The district geo-exchange system of claim 2, wherein the operational data is received from at least one component chosen from the group comprising the district pipe loop, heat source, heat sink, interconnection conduit, circulation pump, valve, ground heat exchanger (GHX), and the meter.

4. The district geo-exchange system of claim 3, wherein the weather forecast data is associated with a geographical area associated with the plurality of buildings.

5. The district geo-exchange system of claim 4, wherein the heating and/or cooling supply and demand forecast is based on historical operational data.

6. The district geo-exchange system of claim 5, wherein the controller generates a cost forecast associated with the heat source and/or heat sink capacity forecast.

7. The district geo-exchange system of claim 6, wherein the controller generates a net demand forecast for the district.

8. The district geo-exchange system of claim 7, wherein the controller determines whether accessing at least one GHX is beneficial and cost-effective to meet the net demand forecast, and when accessing the GSX is neither beneficial nor cost-effective, determine whether another adjacent district module can serve as a potential energy source.

9. The district geo-exchange system of claim 8, wherein the controller adjusts the temperature of the district pipe loop based on the forecast data and the operational data.

10. The district geo-exchange system of claim 9, wherein the controller employs models to predict the heating and cooling demand for the plurality of buildings based on the weather forecast data, net heating and cooling demand for the plurality of buildings connected to the district module, including intrinsic characteristics and extrinsic characteristics associated with each of the plurality of buildings.

11. The district geo-exchange system of claim 10, wherein the controller predicts the economic cost and potential quantity of heating and cooling for each heat source or heat sink associated with the district module; and determines the cost-benefit trade-off to storing heating or cooling in the GHXs to meet forecasted demand and/or to raise or lower the temperature of the working fluid in the district module in order to improve the efficiency of building GSHPs.

12. A method of controlling the heating and cooling requirement in a modular heat energy network, the method comprising the steps of:

causing at least one sensor to measure a parameter associated with the at least one component in modular heat energy network in real-time and gather sensor data, the at least one component chosen from a group comprising a district pipe loop, heat source, heat sink, interconnection conduit, circulation pump, ground source heat pump (GSHP), valve, ground heat exchanger (GHX), and a meter; wherein the GHX is comprised of pipes with a working fluid, the pipes buried in the ground in vertical or horizontal boreholes; and wherein the GSHP transfers energy from a refrigerant to a working fluid within a conduit of the district pipe loop to a heat distribution mechanism within the plurality of buildings, or vice versa;

at a controller, receiving at least one of sensor data, operational data from the at least one component, weather forecast data and current weather data; and at the controller generating a heating and/or cooling supply and demand forecast for each of the plurality of buildings for any time of day.

13. The method of claim 12, wherein the operational data is received from the building ground source heat pump (GSHP), the operational data comprising at least one of an inlet and outlet temperature, runtime and liquid flow rate.

14. The method of claim 13, wherein the operational data is received from at least one component chosen from the group comprising the district pipe loop, heat source, heat sink, interconnection conduit, circulation pump, valve, ground heat exchanger (GHX), and the meter.

15. The method of claim 14, wherein the weather forecast data is associated with a geographical area associated with the plurality of buildings.

16. The method of claim 15, wherein the heating and/or cooling supply and demand forecast is based on historical operational data.

17. The method of claim 16, further comprising generating, by the controller, a cost forecast associated with the heat source and/or heat sink capacity forecast, and a net demand forecast for the plurality of buildings.

18. The method of claim 17, further comprising determining, by the controller, whether accessing at least one GHX is beneficial and cost-effective to meet the net demand forecast, and when accessing the GSX is neither beneficial nor cost-effective, determine whether another adjacent district module can serve as a potential energy source.

19. The method of claim 18, further comprising adjusting, by the controller, the temperature of the district pipe loop based on the forecast data and the operational data.

20. The method of claim 19, further comprising predicting, by the controller, the heating and cooling demand for the plurality of buildings based on the weather forecast data, net heating and cooling demand for the plurality of buildings connected to the district module, including intrinsic characteristics and extrinsic characteristics associated with each of the plurality of buildings.

21. The method of claim 20, further comprising predicting, by the controller, the economic cost and potential quantity of heating and cooling for each heat source or heat sink associated with the district module; and determining the cost-benefit trade-off to storing heating or cooling in the GHXs to meet forecasted demand and/or to raise or lower the temperature of the working fluid in the district module in order to improve the efficiency of building GSHPs.

22. The method of claim 19, further comprising determining, by the controller, for each of the plurality of buildings, including heating coefficient of performance (COP), cooling energy efficiency ratio (EER), average cycle times, percentage time in-use, time-of-use electricity consumption and estimated greenhouse gas (GHG) emission savings, amount of energy to be transferred to and from the ground on an instantaneous basis (BTU/hr or kW).

23. A district geo-exchange system associated with a plurality of buildings in a district module, the system comprising:
   the module comprising at least one component chosen from a group comprising a district pipe loop, heat source, heat sink, interconnection conduit, circulation pump, ground source heat pump (GSHP), valve, ground heat exchanger (GHX), and a meter; wherein the GHX is comprised of pipes with a working fluid, the pipes buried in the ground in vertical or horizontal boreholes; and wherein the GSHPs transfers energy from a refrigerant to a working fluid within a conduit of the district pipe loop to a heat distribution mechanism within the plurality of buildings, or vice versa;
   at least one sensor operable to measure a parameter associated with the at least one component in real-time and gather sensor data;
   a controller comprising a memory device with computer-readable program code stored thereon, a processing device operatively coupled to the memory device, wherein the processing device is configured to execute the computer-readable program code to:
      to receive at least one of sensor data, operational data from the at least one component, weather forecast data and current weather data to generate a heating and/or cooling supply and demand forecast for each of the plurality of buildings for any time of day;
      receive operational data from the building ground source heat pump (GSHP) including inlet and outlet temperature, runtime and liquid flow rate;
      receive operational data from at least one component chosen from the group comprising the district pipe loop, heat source, heat sink, interconnection conduit, circulation pump, valve, ground heat exchanger (GHX), and the meter;
      receive weather forecasts associated with a geographical area associated with the plurality of buildings;
      generate a heating and/or cooling supply and demand forecast for each of the plurality of buildings for any time of day, said heating and/or cooling supply and demand forecast based on historical operational data;
      generate a heat source and/or heat sink capacity forecast for each of the heat sources and heat sink demand forecast based on operational historical data; and generate a cost forecast associated with the heat source and/or heat sink capacity forecast;
      generate a net demand forecast for the district;
      determine whether accessing at least one ground heat exchanger is beneficial and cost-effective to meet the net demand forecast, and when accessing the ground heat exchanger is neither beneficial nor cost-effective, determine whether another adjacent district module can serve as a potential energy source;
   and
   adjust the temperature of the district pipe loop based on the forecasts and the operational data.

* * * * *